US012168821B2

(12) United States Patent
Watanabe et al.

(10) Patent No.: US 12,168,821 B2
(45) Date of Patent: Dec. 17, 2024

(54) SOFT MAGNETIC POWDER, DUST CORE, MAGNETIC ELEMENT, AND ELECTRONIC DEVICE

(71) Applicant: SEIKO EPSON CORPORATION, Tokyo (JP)

(72) Inventors: Mayu Watanabe, Hachinohe (JP); Mitsutaka Inui, Fujimi (JP)

(73) Assignee: SEIKO EPSON CORPORATION (JP)

( * ) Notice: Subject to any disclaimer, the term of this patent is extended or adjusted under 35 U.S.C. 154(b) by 134 days.

(21) Appl. No.: 18/159,872

(22) Filed: Jan. 26, 2023

(65) Prior Publication Data

US 2023/0235433 A1 Jul. 27, 2023

(30) Foreign Application Priority Data

Jan. 27, 2022 (JP) ................................ 2022-010905

(51) Int. Cl.
*C22C 38/02* (2006.01)
*B22F 1/08* (2022.01)
(Continued)

(52) U.S. Cl.
CPC ................ *C22C 38/02* (2013.01); *B22F 1/08* (2022.01); *B22F 5/106* (2013.01); *C22C 38/002* (2013.01);
(Continued)

(58) Field of Classification Search
CPC ....... C22C 38/02; C22C 38/002; C22C 38/12; C22C 38/16; C22C 2202/02; C22C 33/0278; C22C 38/00; B22F 1/08; B22F 5/106; B22F 1/103; B22F 1/142; B22F 3/02; B22F 9/04; B22F 9/082; B22F 2301/35; B22F 2304/10; B22F 2999/00; B22F 1/07; H01F 1/20; H01F 27/255;
(Continued)

(56) References Cited

U.S. PATENT DOCUMENTS

2019/0333663 A1* 10/2019 Watanabe ................ B22F 1/08
2020/0243236 A1* 7/2020 Kudo .................. H01F 41/0246
2020/0243237 A1* 7/2020 Kudo .................. H01F 1/15308

FOREIGN PATENT DOCUMENTS

JP 2019-189928 A 10/2019

* cited by examiner

*Primary Examiner* — Adil A. Siddiqui
(74) *Attorney, Agent, or Firm* — Harness, Dickey & Pierce, P.L.C.

(57) ABSTRACT

A soft magnetic powder contains a particle having a composition represented by $Fe_xCu_aNb_b(Si_{1-y}B_y)_{100-x-a-b}$, and $0.3 \leq a \leq 2.0$, $2.0 \leq b \leq 4.0$, and $72.5 \leq x \leq 75.5$, and y is a number satisfying $f(x) \leq y \leq 0.99$, and $f(x)=(4\times10^{-34})x^{17.56}$. The particle includes a crystal grain having a grain size of 1.0 nm to 30.0 nm, a Cu segregation portion, and a crystal grain boundary. A content proportion of the crystal grain is 30% or more. When the Cu segregation portion positioned in a surface layer portion and having a grain size of 1.0 nm to 5.0 nm is referred to as a first Cu segregation portion, and the Cu segregation portion positioned in an inner portion and having a grain size of 3.0 nm to 10.0 nm is referred to as a second Cu segregation portion, a number proportion of the first Cu segregation portion is 80% or more, and a number proportion of the second Cu segregation portion is 80% or more.

9 Claims, 8 Drawing Sheets

(51) Int. Cl.

| | |
|---|---|
| ***B22F 1/103*** | (2022.01) |
| ***B22F 1/142*** | (2022.01) |
| ***B22F 3/02*** | (2006.01) |
| ***B22F 5/10*** | (2006.01) |
| ***B22F 9/04*** | (2006.01) |
| ***B22F 9/08*** | (2006.01) |
| ***C22C 38/00*** | (2006.01) |
| ***C22C 38/12*** | (2006.01) |
| ***C22C 38/16*** | (2006.01) |
| ***H01F 1/20*** | (2006.01) |
| ***H01F 27/255*** | (2006.01) |

(52) U.S. Cl.
CPC .............. *C22C 38/12* (2013.01); *C22C 38/16* (2013.01); *H01F 1/20* (2013.01); *H01F 27/255* (2013.01); *B22F 1/103* (2022.01); *B22F 1/142* (2022.01); *B22F 3/02* (2013.01); *B22F 9/04* (2013.01); *B22F 9/082* (2013.01); *B22F 2301/35* (2013.01); *B22F 2304/10* (2013.01); *B22F 2999/00* (2013.01); *C22C 2202/02* (2013.01)

(58) Field of Classification Search
CPC .... H01F 1/15308; H01F 1/15333; H01F 3/08; H01F 1/14766; H01F 1/22; H01F 1/12; H01F 1/14; H01F 1/147; H01F 1/14733
See application file for complete search history.

SOFT MAGNETIC POWDER, DUST CORE, MAGNETIC ELEMENT, AND ELECTRONIC DEVICE

The present application is based on, and claims priority from JP Application Serial Number 2022-010905, filed Jan. 27, 2022, the disclosure of which is hereby incorporated by reference herein in its entirety.

BACKGROUND

1. Technical Field

The present disclosure relates to a soft magnetic powder, a dust core, a magnetic element, and an electronic device.

2. Related Art

In various mobile devices including a magnetic element including a dust core, in order to reduce a size and achieve a high output, it is necessary to cope with a high frequency of a conversion frequency and a high current of a switching power supply. Accordingly, a soft magnetic powder contained in the dust core is also required to cope with the high frequency and the high current.

JP-A-2019-189928 discloses a soft magnetic powder having a composition represented by $Fe_xCu_aNb_b(Si_{1-y}B_y)_{100-x-a-b}$, in which a, b and x are expressed by atomic %, and are numbers satisfying 0.3≤a≤2.0, 2.0≤b≤4.0 and 73.0≤x≤79.5, and Y is a number satisfying f(x)≤y≤0.99, and $f(x)=(4\times10^{-34})x^{17.56}$, and containing 30% by volume or more of a crystal structure having a grain size of 1.0 nm or more and 30.0 nm or less. According to such a soft magnetic powder, it is possible to reduce an iron loss at a high frequency by containing minute crystals.

However, the soft magnetic powder disclosed in JP-A-2019-189928 still has room for improvement in terms of stably implementing excellent soft magnetism even at a high frequency and increasing electromagnetic conversion efficiency at a high frequency. Specifically, in the soft magnetic powder, it is a problem to further increase magnetic permeability at a high frequency and further reduce a loss (iron loss) at a high frequency.

SUMMARY

A soft magnetic powder according to an application example of the present disclosure contains a particle having a composition represented by $Fe_xCu_aNb_b(Si_{1-y}B_y)_{100-x-a-b}$, a, b, and x being numbers whose units are atomic %, in which 0.3≤a≤2.0, 2.0≤b≤4.0, and 72.5≤x<75.5, and y being a number satisfying f(x)≤y≤0.99, and $f(x)=(4\times10^{-34})x^{17.56}$, in which the particle includes

- a crystal grain having a grain size of 1.0 nm or more and 30.0 nm or less and containing a Fe—Si crystal,
- a Cu segregation portion in which Cu is segregated, and
- a crystal grain boundary, a content proportion of the crystal grain in the particle is 30% or more, and when the Cu segregation portion positioned in a surface layer portion of the particle and having a grain size of 1.0 nm or more and 5.0 nm or less is referred to as a first Cu segregation portion, and the Cu segregation portion positioned in an inner portion of the particle and having a grain size of 3.0 nm or more and 10.0 nm or less is referred to as a second Cu segregation portion, a number proportion of the first Cu segregation portion in the Cu segregation portion positioned in the surface layer portion is 80% or more, and a number proportion of the second Cu segregation portion in the Cu segregation portion positioned in the inner portion is 80% or more.

A dust core according to an application example of the present disclosure contains the soft magnetic powder according to the application example of the present disclosure.

A magnetic element according to an application example of the present disclosure includes the dust core according to the application example of the present disclosure.

An electronic device according to an application example of the present disclosure includes the magnetic element according to the application example of the present disclosure.

DESCRIPTION OF EXEMPLARY EMBODIMENTS

Hereinafter, a soft magnetic powder, a dust core, a magnetic element, and an electronic device according to the present disclosure will be described in detail based on a preferred embodiment shown in the accompanying drawings.

1. Soft Magnetic Powder

The soft magnetic powder according to an embodiment is a metal powder which exhibits soft magnetism. The soft magnetic powder can be applied to any application, and for example, is used for manufacturing various green compacts such as dust cores and electromagnetic wave absorbers in which particles are bound to each other via a binder.

The soft magnetic powder according to the embodiment contains a particle having a composition represented by $Fe_xCu_aNb_b(Si_{1-y}B_y)_{100-x-a-b}$. This compositional formula represents a proportion in a composition containing five elements Fe, Cu, Nb, Si, and B.

a, b, and x are numbers whose units are atomic %. $0.3 \leq a \leq 2.0$, $2.0 \leq b \leq 4.0$, and $72.5 \leq x < 75.5$.

$f(x) \leq y \leq 0.99$, and f(x), which is a function of x, is $f(x) = (4 \times 10^{-34})x^{17.56}$.

Figure 1:
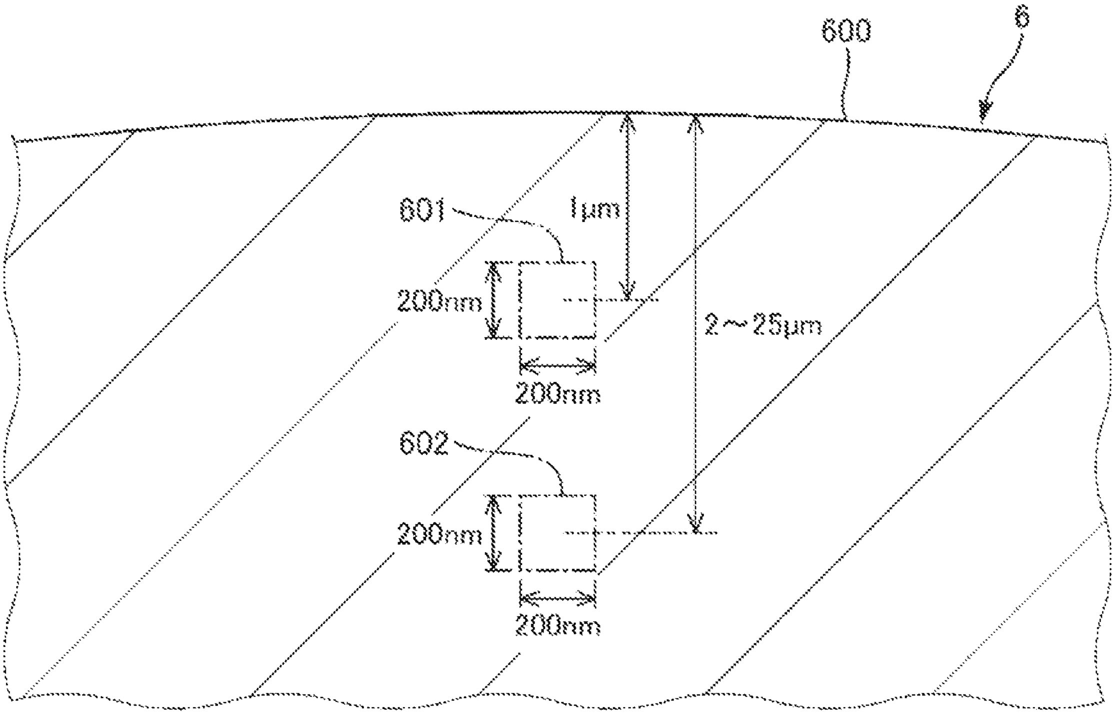
FIG. 1 is a diagram schematically showing a cross section of one particle in a soft magnetic powder according to an embodiment.

FIG. 1 is a diagram schematically showing a cross section of one particle 6 in the soft magnetic powder according to the embodiment.

In the present embodiment, in the cross section of the particle 6 shown in FIG. 1, a range of 200 nm square centered on a position at a depth of 1 μm from a surface 600 is referred to as a "surface layer portion 601". A range of 200 nm square set at a position where a depth from the surface 600 is 2 μm or more and 25 μm or less, and preferably set at a center of the cross section of the particle 6 is referred to as an "inner portion 602".

Figure 2:
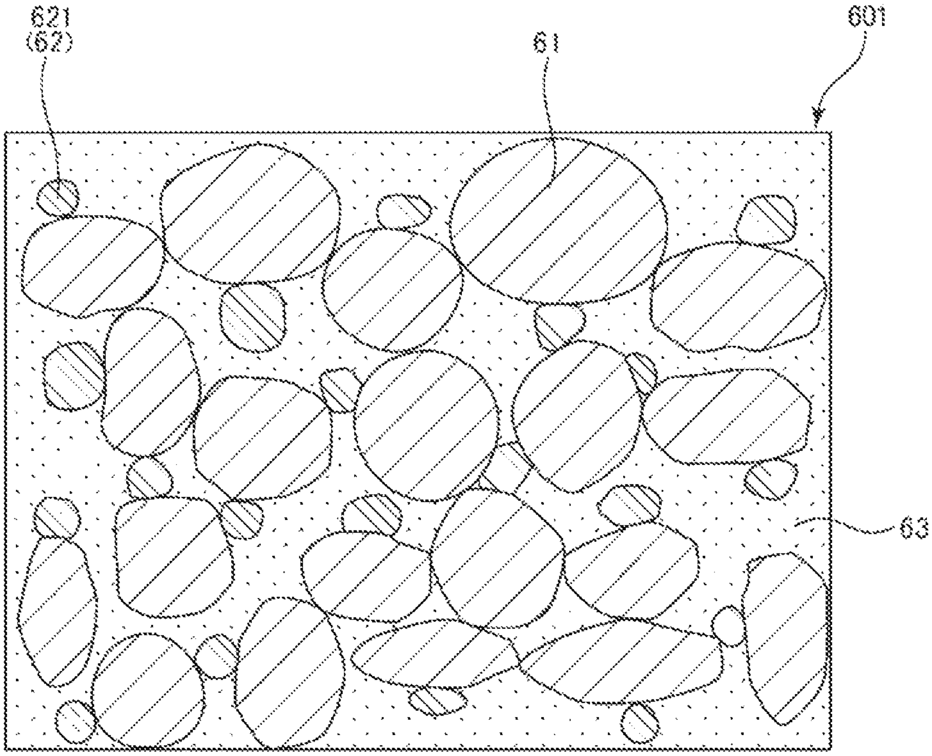
FIG. 2 is a schematic view of a part of a surface layer portion shown in FIG. 1, which is magnified and observed with an electron microscope.
Figure 3:
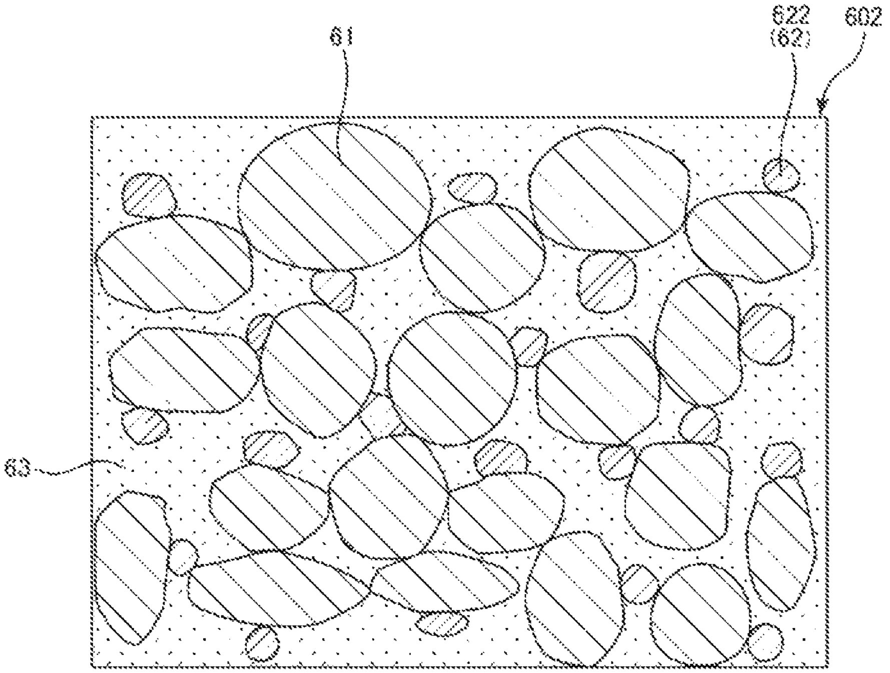
FIG. 3 is a schematic view of a part of an inner portion shown in FIG. 1, which is magnified and observed with an electron microscope.

FIG. 2 is a schematic view of a part of the surface layer portion 601 shown in FIG. 1, which is magnified and observed with an electron microscope. FIG. 3 is a schematic view of a part of the inner portion 602 shown in FIG. 1, which is magnified and observed with an electron microscope.

The particle 6 shown in FIG. 1 has crystal grains 61, Cu segregation portions 62, and crystal grain boundaries 63, as shown in FIGS. 2 and 3.

Each of the crystal grains 61 is a region containing a Fe—Si crystal and has a grain size of 1.0 nm or more and 30.0 nm or less.

Each of the Cu segregation portions 62 is a region in which Cu is segregated. In the Cu segregation portions 62, the Cu segregation portion 62 positioned in the surface layer portion 601 shown in FIG. 2 and having a grain size of 1.0 nm or more and 5.0 nm or less is referred to as a "first Cu segregation portion 621". The Cu segregation portion 62 positioned in the inner portion 602 shown in FIG. 3 and having a grain size of 3.0 nm or more and 10.0 nm or less is referred to as a "second Cu segregation portion 622". In the soft magnetic powder according to the present embodiment, a state of the Cu segregation portion 62, for example, the grain size, in the surface layer portion 601 is different from a state of the Cu segregation portion 62 in the inner portion 602.

A content proportion of the crystal grains 61 in the particle 6 is 30% or more. A number proportion of first Cu segregation portions 621 in the Cu segregation portion 62 positioned in the surface layer portion 601 is 80% or more. A number proportion of second Cu segregation portions 622 in the Cu segregation portion 62 positioned in the inner portion 602 is 80% or more.

Such a soft magnetic powder, which will be described in detail later, can be used to manufacture a dust core which achieves high magnetic permeability and a low iron loss at a high frequency. Accordingly, a magnetic element having excellent DC superimposition characteristics and high electromagnetic conversion efficiency at a high frequency can be implemented.

Hereinafter, a composition of the particle 6 will be described.

1.1. Composition

Iron (Fe) is an element which greatly affects basic magnetic properties and mechanical properties of the particle 6.

A content proportion x of Fe is 72.5 atomic % or more and less than 75.5 atomic %, preferably 72.8 atomic % or more and 75.0 atomic % or less, and more preferably 73.0 atomic % or more and 74.5 atomic % or less. When the content proportion x of Fe goes below the above lower limit value, a saturation magnetic flux density of the soft magnetic powder may decrease. On the other hand, when the content proportion x of Fe exceeds the above upper limit value, an amorphous structure cannot be stably formed during manufacturing of the soft magnetic powder, and thus it may be difficult to form the crystal grain 61 having a minute grain size as described above.

Copper (Cu) tends to be separated from Fe when the soft magnetic powder according to the embodiment is manufactured from a raw material. Therefore, since Cu is contained, the composition fluctuates, and a region which is easily crystallized partially is generated in the particle 6. As a result, precipitation of Fe phase of a body-centered cubic lattice, which is relatively easily crystallized, is promoted, and the crystal grain 61 can be easily formed.

A content proportion a of Cu is 0.3 atomic % or more and 2.0 atomic % or less, preferably 0.5 atomic % or more and 1.5 atomic % or less, and more preferably 0.7 atomic % or more and 1.3 atomic % or less. When the content proportion a of Cu goes below the above lower limit value, miniaturization of the crystal grain 61 may be impaired, and the crystal grain 61 having a grain size in the above ranges may not be formed. On the other hand, when the content proportion a of Cu exceeds the above upper limit value, the mechanical properties of the particle 6 may be deteriorated and the particle 6 may become brittle.

Niobium (Nb) contributes to miniaturization of the crystal grain 61 together with Cu when a heat treatment is performed. Therefore, it is possible to easily form the crystal grain 61 having a minute grain size as described above.

A content proportion b of Nb is 2.0 atomic % or more and 4.0 atomic % or less, preferably 2.5 atomic % or more and 3.5 atomic % or less, and more preferably 2.7 atomic % or more and 3.3 atomic % or less. When the content proportion b of Nb goes below the above lower limit value, miniaturization of the crystal grain 61 may be impaired, and the crystal grain 61 having a grain size in the above ranges may not be formed. On the other hand, when the content proportion b of Nb exceeds the above upper limit value, the mechanical properties of the particle 6 may be deteriorated and the particle 6 may become brittle. Magnetic permeability of the soft magnetic powder may decrease.

Silicon (Si) promotes amorphization when the soft magnetic powder according to the embodiment is manufactured from a raw material. Therefore, when the soft magnetic powder according to the embodiment is manufactured, a homogeneous amorphous structure is once formed, and thereafter, by crystallizing the amorphous structure, the crystal grain 61 having a more uniform grain size is easily formed. Since the uniform grain size contributes to averaging of magnetocrystalline anisotropy in each crystal grain 61, a coercive force can be reduced, the magnetic permeability can be increased, and the soft magnetism can be improved.

Boron (B) promotes the amorphization when the soft magnetic powder according to the embodiment is manufactured from a raw material. Therefore, when the soft magnetic powder according to the embodiment is manufactured, a homogeneous amorphous structure is once formed, and thereafter, by crystallizing the amorphous structure, the crystal grain 61 having a more uniform grain size is easily formed. Since the uniform grain size contributes to the averaging of the magnetocrystalline anisotropy in each crystal grain 61, the coercive force can be reduced, the magnetic permeability can be increased, and the soft magnetism can be improved. By using Si and B in combination, the amorphization can be synergistically promoted based on a difference in an atomic radius between Si and B.

Here, when a total content proportion of Si and B is 1 and a proportion of the content proportion of B to the total content proportion of Si and B is y, a proportion of the content proportion of Si to the total content proportion of Si and B is 1−y.

This y is a number satisfying $f(x) \leq y \leq 0.99$. f(x), which is a function of x, is $f(x)=(4\times10^{-34})x^{17.56}$.

Figure 4:
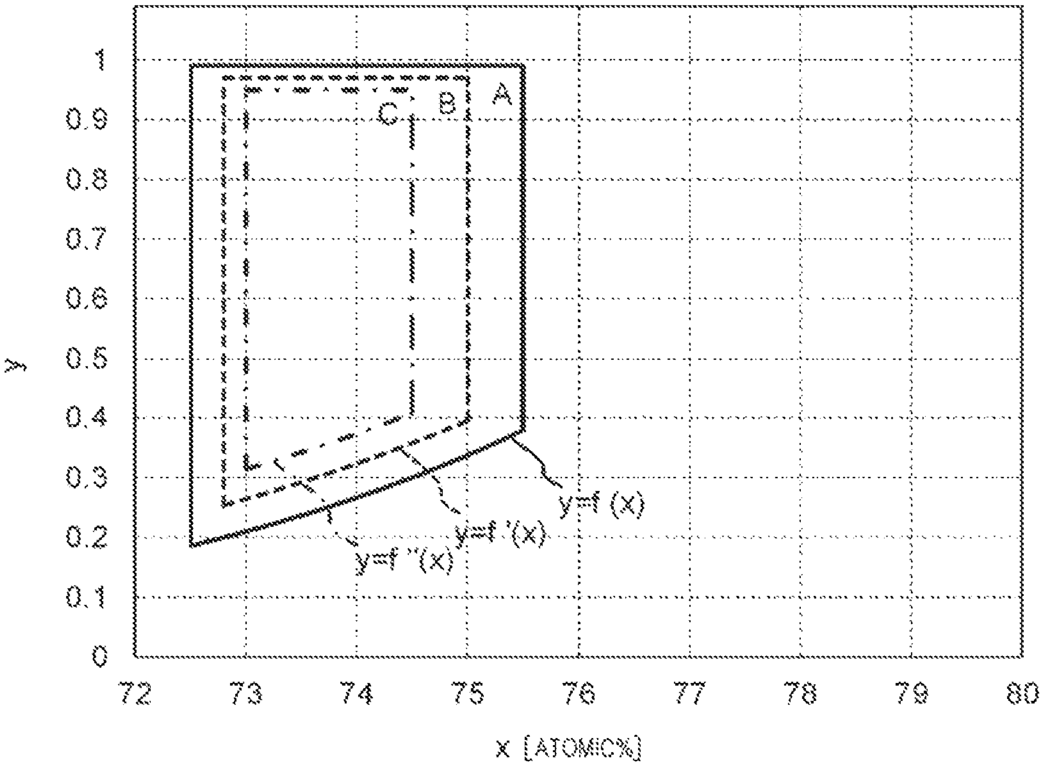
FIG. 4 is a diagram showing a region, in a two-axis orthogonal coordinate system in which x is a horizontal axis and y is a vertical axis, in which a range of x and a range of y in a compositional formula of the soft magnetic powder according to the embodiment overlap each other.

FIG. 4 is a diagram showing a region, in a two-axis orthogonal coordinate system in which x is a horizontal axis and y is a vertical axis, in which a range of x and a range of y in the compositional formula of the soft magnetic powder according to the embodiment overlap each other.

In FIG. 4, a region A in which the range of x and the range of y overlap is inside a solid line drawn in the orthogonal coordinate system.

Specifically, when (x, y) coordinates satisfying four relationships of x=72.5, x=75.5, y=f(x), and y=0.99 are plotted in the orthogonal coordinate system, the region A is a closed region surrounded by three drawn straight lines and one drawn curve. The region A does not include a straight line of x=75.5.

y is preferably a number satisfying $f'(x) \leq y \leq 0.97$. f'(x), which is a function of x, is $f'(x)=(4\times10^{-29})x^{14.93}$.

A broken line shown in FIG. 4 indicates a region B in which the above preferable range of x and the above preferable range of y overlap each other.

Specifically, when the (x, y) coordinates satisfying four relationships of x=72.8, x=75.0, y=f'(x), and y=0.97 are plotted in the orthogonal coordinate system, the region B is a closed region surrounded by three drawn straight lines and one drawn curve.

y is more preferably a number satisfying $f''(x) \leq y \leq 0.95$. f''(x), which is a function of x, is $f''(x)=(4\times10^{-29})x^{14.93}+0.05$.

A one-dot chain line shown in FIG. 4 indicates a region C in which the above more preferable range of x and the above more preferable range of y overlap each other.

Specifically, when the (x, y) coordinates satisfying four relationships of x=73.0, x=74.5, y=f''(x), and y=0.95 are plotted in the orthogonal coordinate system, the region C corresponds to a closed region surrounded by three drawn straight lines and one drawn curve.

The soft magnetic powder in which x and y are at least in the region A can form, when manufactured, a homogeneous amorphous structure with a high probability. Therefore, by crystallizing the amorphous structure, the crystal grain 61 having a particularly uniform and fine grain size can be formed. Accordingly, a soft magnetic powder having a sufficiently reduced coercive force and increased magnetic permeability can be obtained. By using the soft magnetic powder, electrical resistance between the crystal grains 61 is increased, and thus an iron loss of the dust core can be reduced to be sufficiently low.

The soft magnetic powder in which x and y are at least in the region A can form the uniform crystal grain 61 even when the content proportion of Fe is sufficiently increased. Accordingly, a soft magnetic powder having a sufficiently increased magnetic permeability and saturation magnetic flux density can be obtained. As a result, it is possible to obtain a dust core having high magnetic permeability and a high saturation magnetic flux density while achieving a sufficiently low iron loss.

When a value of y is smaller than that in the region A, a balance between the content proportion of Si and the content proportion of B is lost, and thus it is difficult to form a homogeneous amorphous structure when the soft magnetic powder is manufactured. Therefore, the crystal grain 61 having a minute grain size cannot be formed, and the coercive force cannot be sufficiently reduced.

On the other hand, when the value of y is larger than that in the region A, the balance between the content proportion of Si and the content proportion of B is lost, and thus it is difficult to form a homogeneous amorphous structure when the soft magnetic powder is manufactured. Therefore, the crystal grain 61 having a minute grain size cannot be formed, and the coercive force cannot be sufficiently reduced.

A lower limit value of y is determined by the function of x as described above, and is preferably 0.30 or more, more preferably 0.45 or more, and still more preferably 0.55 or more. Accordingly, it is possible to further increase the saturation magnetic flux density and the magnetic permeability of the soft magnetic powder.

In particular, in the region B and the region C, by reducing the content proportion of Fe, it is possible to achieve a low coercive force while preventing a decrease in the magnetic permeability of the soft magnetic powder.

A total of the content proportion of Si and the content proportion of B, which is (100-x-a-b), is not particularly limited, and is preferably 15.0 atomic % or more and 24.0 atomic % or less, more preferably 18.0 atomic % or more and 23.5 atomic % or less, and still more preferably 20.0 atomic % or more and 23.0 atomic % or less. When (100-x-a-b) is within the above ranges, the crystal grain 61 having a particularly uniform grain size can be formed in the soft magnetic powder.

y(100-x-a-b) corresponds to the content proportion of B in the soft magnetic powder. y(100-x-a-b) is appropriately set in consideration of the coercive force, the saturation magnetic flux density, and the like as described above, and is preferably $5.0 \leq y(100-x-a-b) \leq 17.0$, more preferably $7.0 \leq y(100-x-a-b) \leq 16.0$, and still more preferably $8.0 \leq y(100-x-a-b) \leq 15.0$.

Accordingly, a soft magnetic powder containing boron (B) at a relatively high concentration can be obtained. Such a soft magnetic powder makes it possible to form, even when the content proportion of Fe is high, a homogeneous amorphous structure during manufacturing of the soft magnetic powder. Therefore, by a subsequent heat treatment, the crystal grain 61 having a minute grain size and a relatively uniform grain size can be formed, and a high magnetic flux density and high magnetic permeability can be achieved while sufficiently reducing the coercive force. Since the electrical resistance between the crystal grains 61 is increased, the iron loss of the dust core can be reduced to be sufficiently low.

When y(100-x-a-b) goes below the above lower limit value, the content proportion of B becomes small. Therefore, when the soft magnetic powder is manufactured, the amorphization may be difficult depending on the entire composition. Accordingly, the low coercive force and the high electrical resistance may be inhibited. On the other hand, when y(100-x-a-b) exceeds the above upper limit value, the content proportion of B increases and the content proportion of Si decreases relatively, and thus the magnetic permeability of the soft magnetic powder may decrease and the saturation magnetic flux density may decrease.

The soft magnetic powder according to the embodiment may contain, in addition to the composition represented by $Fe_xCu_aNb_b(Si_{1-y}B_y)_{100-x-a-b}$, an impurity. Examples of the impurity include all elements other than those described above, and a total content proportion of impurities is preferably 0.50 atomic % or less. Within this range, impurities do not easily reduce an effect of the present disclosure, and are thus allowed to be contained.

A content proportion of each element in the impurities is preferably 0.05 atomic % or less. Within this range, impurities do not easily reduce the effect of the present disclosure, and are thus allowed to be contained.

Although the composition of the soft magnetic powder according to the embodiment is described above, the composition and the impurities are specified by a following analysis method.

Examples of the analysis method include iron and steel-atomic absorption spectrometry defined in JIS G 1257:2000, iron and steel-ICP emission spectrometry defined in JIS G 1258:2007, iron and steel-spark discharge emission spectrometry defined in JIS G 1253:2002, iron and steel-fluorescent X-ray spectrometry defined in JIS G 1256:1997, and gravimetric, titration and absorption spectrometric methods defined in JIS G 1211 to JIS G 1237.

Specific examples thereof include a solid emission spectrometer manufactured by SPECTRO, in particular, a spark discharge emission spectrometer, model: SPECTROLAB, type: LAVMB08A, or ICP apparatus CIROS120 type manufactured by Rigaku Corporation.

In particular, when specifying carbon (C) and sulfur (S), an infrared absorption method after combustion in a current of oxygen (combustion in high frequency induction furnace) defined in JIS G 1211:2011 is also used. Specific examples thereof include a carbon-sulfur analyzer CS-200 manufactured by LECO Corporation.

In particular, when nitrogen (N) and oxygen (O) are specified, methods for determination of nitrogen content for an iron and steel defined in JIS G 1228:1997 and general rules for determination of oxygen in metallic materials defined in JIS Z 2613:2006 are also used. Specific examples thereof include an oxygen-nitrogen analyzer, TC-300/EF-300 manufactured by LECO Corporation.

1.2. Crystal Grain

As described above, the particle 6 of the soft magnetic powder according to the embodiment has the crystal grain 61 containing a Fe—Si crystal and having a grain size of 1.0 nm or more and 30.0 nm or less.

The Fe—Si crystal has a characteristic that the saturation magnetic flux density is high, which is unique to a Fe—Si-based composition. Since a number density of the crystal grains 61 is increased by miniaturizing the crystal grains 61 containing Fe—Si crystals and making grain sizes uniform, saturation magnetic flux densities of the crystal grain 61 are less likely to decrease even when the crystal grains 61 are miniaturized. Therefore, in the particle 6, a high saturation magnetic flux density can be implemented.

In addition, in the particle 6, since the crystal grain 61 is miniaturized, the magnetocrystalline anisotropy in the crystal grain 61 is easily averaged. Therefore, even when a Fe concentration is high, an increase in the coercive force can be reduced. Therefore, it is possible to reduce the coercive force of the particle 6. When a large amount of the crystal grains 61 having such a grain size are contained, the magnetic permeability of the particle 6 becomes high.

As described above, it is possible to reduce the coercive force while increasing the saturation magnetic flux density and the magnetic permeability of the particle 6.

When the grain size of the crystal grain 61 is within the above range, the electrical resistance between the particles 6 increases. This is considered to be because a number density of grain boundaries between the crystal grains 61 is increased because the crystal grains 61 are fine and have a uniform grain size. When the electrical resistance between the particles 6 increases, it becomes difficult for an eddy current to flow, thereby reducing an eddy current loss in the dust core. Therefore, the soft magnetic powder containing the particle 6 containing the crystal grain 61 contributes to implementation of a dust core having a low iron loss.

In the particle 6, a content proportion of the crystal grains 61 is preferably 55% or more, more preferably 55% or more and 99% or less, and still more preferably 70% or more and 95% or less. When the content proportion of the crystal grains 61 goes below the above lower limit value, a proportion of the crystal grains 61 decreases. Therefore, the magnetocrystalline anisotropy is insufficiently averaged, and the magnetic permeability of the soft magnetic powder may decrease or the coercive force may increase. The saturation magnetic flux density may decrease or the iron loss of the dust core may increase. On the other hand, the content proportion of the crystal grains 61 may exceed the above upper limit value, but instead, it is considered that a content proportion of the crystal grain boundaries 63, which will be described later, decreases. As a result, the crystal grains 61 tend to grow rapidly, and coarsening of the crystal grains 61 may easily occur due to a slight deviation in a heat treatment temperature or the like. Accordingly, the magnetic permeability of the soft magnetic powder may decrease and the coercive force of the soft magnetic powder may increase.

The content proportion of the crystal grains 61 is a volume proportion, but is considered to be substantially equal to an area proportion occupied by the crystal grains 61 with respect to an area of a cut surface, and thus the area proportion may be regarded as the content proportion. Therefore, the content proportion of the crystal grains 61 is obtained in an observation image, as a proportion of areas occupied by the crystal grains 61 to an entire area in the above range.

The grain size of the crystal grain 61 is obtained by a method of observing the cut surface of the particle 6 with an electron microscope and reading, in the observation image, a range of 200 nm square centered at a depth of 5 μm from a surface. In this method, a true circle having the same area as the area of the crystal grain 61 is assumed, and a diameter of the true circle, that is, an equivalent circle diameter can be set as the grain size of the crystal grain 61. For example, a scanning transmission electron microscope (STEM) is used as the electron microscope.

An average grain size of the crystal grains 61 is obtained by averaging grain sizes of the read crystal grains 61. The average grain size of the crystal grains 61 is preferably 2.0 nm or more and 25.0 nm or less, and more preferably 5.0 nm or more and 20.0 nm or less. Accordingly, the above effect, that is, an effect that the coercive force is low and the magnetic permeability is high, and an effect that the saturation magnetic flux density is high and the iron loss of the dust core is low, become more remarkable. The average grain size of the crystal grains 61 is calculated from 10 or more grain sizes.

The particle 6 may contain crystal grains having a grain size outside the above range, that is, crystal grains having a grain size of less than 1.0 nm or more than 30.0 nm.

Containing of the Fe—Si crystal in the crystal grain 61 can be specified by energy dispersive X-ray spectroscopy (EDX) analysis using STEM. Specifically, first, an observation image of the cross section of the particle 6 is acquired by STEM. The crystal grain 61 is specified from the observation image. Next, the EDX analysis using STEM is performed, and quantitative analysis of each element is performed based on an analysis result by a quantification method. If the Fe concentration is the highest in an atomic proportion in the crystal grain 61 and a Si concentration is the second highest, it can be said that a Fe—Si crystal is contained.

For example, JEM-ARM200F manufactured by JEOL Ltd. can be used as STEM. NSS7 manufactured by Thermo Fisher Scientific can be used as an EDX analyzer. An acceleration voltage during the analysis is set to 120 kV, and Cliff-Lorimer (MBTS), which does not involve absorption correction, is used as the quantification method using an EDX spectrum.

1.3. First Cu Segregation Portion

As described above, the particle 6 has the first Cu segregation portions 621. The first Cu segregation portion 621 is a portion positioned in the surface layer portion 601 of the particle 6 and in which Cu is locally segregated, and is a portion having a grain size of 1.0 nm or more and 5.0 nm or less. Presence of such a fine first Cu segregation portion 621 in the surface layer portion 601 indirectly confirms that the Cu segregation portions 62 are distributed over substantially the entire particle 6. The surface layer portion 601 is more likely to dissipate heat than the inner portion 602 in a heat treatment performed during manufacturing of the particle 6. Therefore, the presence of the fine first Cu segregation portion 621 in the surface layer portion 601 indicates that the Cu segregation portions 62 are distributed over the entire particle 6 with a high probability. Accordingly, the crystal grain 61 generated by the Cu segregation portion 62 serving as a nucleation site can be miniaturized and the grain size can be made uniform, and the high magnetic permeability and the low coercive force can be achieved. The electrical resistance between the crystal grains 61 is increased, and the iron loss of the dust core can be reduced to be even lower.

The grain size of the first Cu segregation portion 621 is measured as follows.

First, the cross section of the particle 6 is subjected to EDX analysis using STEM. Next, a surface analysis image representing a Cu concentration distribution is acquired based on an analysis result by a quantification method.

Next, in the obtained surface analysis image, the number of Cu segregation portions 62 is counted for each grain size of the Cu segregation portions 62 in a range of 200 nm square centered on a position at a depth of 1 μm from the surface of the particle 6 (surface layer portion 601). Specifically, first, binarization image processing is performed on the surface analysis image representing a Cu concentration distribution, and a Cu segregation portion having a grain size of 1 nm or more is extracted as the Cu segregation portion 62. The grain size is a maximum length which can be taken at a portion in which Cu is segregated. Among the grain sizes thus obtained, a grain size within the above range is defined as the grain size of the first Cu segregation portion 621.

A number proportion of the first Cu segregation portions 621 in the extracted Cu segregation portion 62 is 80% or more, and preferably 90% or more. Accordingly, an effect of miniaturizing the crystal grains 61 and making grain sizes uniform becomes apparent.

When the number proportion of the first Cu segregation portions 621 goes below the above lower limit value, dispersibility of the first Cu segregation portion 621 may decrease. Therefore, a region which benefits from the effect of miniaturizing the crystal grains 61 and making the grain sizes uniform may be limited to a part of the particle 6.

On the other hand, the particle 6 may include the Cu segregation portion 62 having a grain size outside the above range, that is, the Cu segregation portion 62 which does not correspond to the first Cu segregation portion 621, in the surface layer portion 601.

An average grain size of the first Cu segregation portions 621 is preferably 1.5 nm or more and 4.5 nm or less, and more preferably 2.0 nm or more and 4.0 nm or less. When the average grain size of the first Cu segregation portions 621 is within the above ranges, the crystal grains 61 which are sufficiently fine and which have a more uniform grain size can be formed by a heat treatment. As a result, the eddy current flowing through the surface layer portion 601 is reduced by the skin effect, and it is possible to further reduce the coercive force of the soft magnetic powder while reducing an iron loss of the soft magnetic powder.

The average grain size of the first Cu segregation portions 621 is calculated from 10 or more counting results by counting the number of the first Cu segregation portions 621 for each grain size of the first Cu segregation portions 621.

A maximum value of a Cu concentration in the first Cu segregation portion 621 is not particularly limited, and is preferably more than 6.0 atomic %. In this way, by including the first Cu segregation portion 621 as a nucleation site in which Cu is segregated at a high concentration, an action of the first Cu segregation portion 621 is strengthened during a heat treatment.

The maximum value of the Cu concentration in the first Cu segregation portion 621 is more than 6.0 atomic % as described above, and is preferably 10.0 atomic % or more, and more preferably 16.0 atomic % or more.

On the other hand, from the viewpoint of avoiding an uneven distribution in the first Cu segregation portions 621, the maximum value of the Cu concentration is preferably 70.0 atomic % or less, and more preferably 60.0 atomic % or less.

The Cu concentration in the first Cu segregation portion 621 is preferably 2.0 times or more, more preferably 5.0 times or more and 50 times or less, and still more preferably 7.0 times or more and 30 times or less a Cu concentration in the crystal grain boundary 63. Accordingly, the first Cu segregation portion 621 favorably generates a crystal plane for promoting growth of the crystal grain 61, thereby sufficiently exhibiting a function as the nucleation site. Further, by sufficiently reducing the Cu concentration in the crystal grain boundary 63, a decrease in a crystallization temperature of the crystal grain boundary 63 is prevented. The Cu concentration in the first Cu segregation portion 621 may exceed the above upper limit value, but this may cause coarsening of the first Cu segregation portion 621, which may adversely affect the crystal grain 61 and the crystal grain boundary 63.

Further, the Cu concentration in the first Cu segregation portion 621 is preferably 2.0 times or more, more preferably 5.0 times or more and 50 times or less, and still more preferably 7.0 times or more and 30 times or less a Cu concentration in the crystal grain 61. Accordingly, the first Cu segregation portion 621 favorably generates the crystal plane for promoting the growth of the crystal grain 61, thereby sufficiently exhibiting the function as the nucleation site. Further, the first Cu segregation portion 621 is present without being incorporated into the crystal grain 61, and the coarsening of the crystal grain 61 can be reduced. By sufficiently reducing the Cu concentration in the crystal grain 61, a decrease in the saturation magnetic flux density of the crystal grain 61 and an increase in the coercive force of the crystal grain 61 due to Cu are prevented. The Cu concentration in the first Cu segregation portion 621 may exceed the above upper limit value, but this may cause coarsening of the first Cu segregation portion 621.

The Cu concentration in the first Cu segregation portion 621 and the Cu concentration in the crystal grain 61 are obtained by performing EDX analysis using STEM on a central portion of the first Cu segregation portion 621 and a central portion of the crystal grain 61, and by a quantification method based on an analysis result of the EDX analysis.

The Cu concentration in the crystal grain boundary 63 is obtained by performing EDX analysis using STEM on an intermediate point between two adjacent first Cu segregation portions 621 in the crystal grain boundary 63, and by a quantification method based on an analysis result of the EDX analysis.

A Cu concentration in the surface layer portion 601 is preferably 1.1 times or more, and more preferably 1.2 times or more and 3.0 times or less a Cu concentration in the inner portion 602. Accordingly, in the surface layer portion 601 where the crystal grain 61 is likely to be enlarged, an effect of preventing enlargement of the crystal grain 61 can be obtained by the first Cu segregation portion 621 in which Cu is segregated at a high concentration. In this case, the content proportion of the crystal grains 61 having the above grain size in the entire particle 6 can be sufficiently increased.

The Cu concentration in the surface layer portion 601 is measured in the above range of 200 nm square, that is, in a range including all of the crystal grain 61, the first Cu segregation portion 621, and the crystal grain boundary 63.

The Cu concentration in the inner portion 602 is measured in the above range of 200 nm square, that is, in a range including all of the crystal grain 61, the second Cu segregation portion 622, and the crystal grain boundary 63.

1.4. Second Cu Segregation Portion

As described above, the particle 6 has the second Cu segregation portions 622. The second Cu segregation portion 622 is a portion positioned in the inner portion 602 of the particle 6 and in which Cu is locally segregated, and is a portion having a grain size of 3.0 nm or more and 10.0 nm or less. Presence of the second Cu segregation portion 622 having such a grain size in the inner portion 602 indicates that enlargement of the second Cu segregation portion 622 is prevented in the inner portion 602 in which heat is less likely to be dissipated than in the surface layer portion 601. Therefore, the presence of the relatively fine second Cu segregation portion 622 in the inner portion 602 indicates that the Cu segregation portions 62 are distributed over the entire particle 6 with a high probability. Accordingly, the crystal grain 61 generated by the Cu segregation portion 62 serving as a nucleation site can be miniaturized and the grain size can be made uniform, and the high magnetic permeability and the low coercive force can be achieved. The electrical resistance between the crystal grains 61 is increased, and the iron loss of the dust core can be reduced to be even lower.

The grain size of the second Cu segregation portion 622 is measured as follows.

First, the cross section of the particle 6 is subjected to EDX analysis using STEM. Next, a surface analysis image representing a Cu concentration distribution is acquired based on an analysis result by a quantification method.

Next, in the obtained surface analysis image, the number of Cu segregation portions 62 is counted for each grain size of the Cu segregation portions 62 in a range of 200 nm square set at any position where a depth from the surface of the particle 6 is 2 μm or more and 25 μm or less, and preferably set at a center of the cross section of the particle 6 (inner portion 602). Specifically, first, binarization image processing is performed on the surface analysis image representing the Cu concentration distribution, and a Cu segregation portion having a grain size of 1 nm or more is extracted as the Cu segregation portion 62. The grain size is a maximum length which can be taken at a portion in which Cu is segregated. Among the grain sizes thus obtained, a grain size within the above range is defined as the grain size of the second Cu segregation portion 622.

A number proportion of the second Cu segregation portions 622 in the extracted Cu segregation portion 62 is 80% or more, and preferably 90% or more. Accordingly, an effect of miniaturizing the crystal grains 61 and making grain sizes uniform becomes apparent.

When the number proportion of the second Cu segregation portions 622 goes below the above lower limit value, dispersibility of the second Cu segregation portion 622 may decrease. Therefore, a region which benefits from the effect of miniaturizing the crystal grains 61 and making the grain sizes uniform may be limited to a part of the particle 6.

On the other hand, the particle 6 may include the Cu segregation portion 62 having a grain size outside the above range, that is, the Cu segregation portion 62 which does not correspond to the second Cu segregation portion 622, in the inner portion 602.

An average grain size of the second Cu segregation portions 622 is preferably larger than the average grain size of the first Cu segregation portions 621, more preferably 1.2 times or more, and still more preferably 1.5 times or more and 2.5 times or less the average grain size of the first Cu segregation portions 621. Specifically, the average grain size of the second Cu segregation portions 622 is preferably 3.5 nm or more and 8.0 nm or less, and more preferably 4.0 nm or more and 6.0 nm or less. When the average grain size of the second Cu segregation portions 622 is within the above ranges, crystal grains 61 which are slightly larger than the crystal grain 61 in the surface layer portion 601, but are sufficiently fine and have a more uniform grain size can be formed by a heat treatment. As a result, it is possible to achieve both high magnetic permeability and a low coercive force of the soft magnetic powder.

The average grain size of the second Cu segregation portions 622 is calculated from 10 or more counting results by counting the number of the second Cu segregation portions 622 for each grain size of the second Cu segregation portions 622.

A maximum value of the Cu concentration in the second Cu segregation portion 622 is not particularly limited, and is preferably more than 6.0 atomic %. In this way, by including the second Cu segregation portion 622 as a nucleation site in which Cu is segregated at a high concentration, an action of the second Cu segregation portion 622 is strengthened during a heat treatment. Accordingly, the crystal grains 61 having a uniform grain size can be efficiently generated from the surface of the particle 6 to a deep position. As a result, it is possible to achieve both averaging of the magnetocrystalline anisotropy and an increase of a proportion occupied by the crystal grains 61 having a uniform grain size, and it is possible to more favorably achieve both the low coercive force and the high magnetic permeability.

The maximum value of the Cu concentration in the second Cu segregation portion 622 is more than 6.0 atomic % as described above, and is preferably 10.0 atomic % or more, and more preferably 16.0 atomic % or more.

On the other hand, from the viewpoint of avoiding an uneven distribution of the second Cu segregation portions 622, the maximum value of the Cu concentration is preferably 70.0 atomic % or less, and more preferably 60.0 atomic % or less.

1.5. Crystal Grain Boundary

As described above, the particle 6 has the crystal grain boundaries 63. The crystal grain boundary 63 is a region having an amorphous structure adjacent to the crystal grain 61, and is preferably a region having a Nb concentration and a B concentration higher than a Nb concentration and a B concentration in the crystal grain 61. Therefore, the crystal grain boundary 63 can be specified based on a structure, a Nb concentration distribution, and a B concentration distribution. In such a crystal grain boundary 63, since the crystallization temperature is high, an amorphous state is easily maintained even after a heat treatment. Therefore, the crystal grain boundary 63 has an effect of reducing the coarsening of the crystal grain 61. Accordingly, the grain sizes of the crystal grains 61 can be more finely and more uniformly maintained.

The content proportion of the crystal grain boundaries 63 in the particle 6 is preferably 5.0 times or less, more preferably 0.02 time or more and 2.0 times or less, and still more preferably 0.10 time or more and less than 1.0 time the content proportion of the crystal grains 61. Accordingly, a proportion balance between the crystal grain 61 and the crystal grain boundary 63 is optimized. As a result, miniaturization of the crystal grain 61 and uniformity of the grain sizes become more remarkable.

The Nb concentration in the crystal grain boundary 63 is preferably higher than the Nb concentration in the crystal grain 61, more preferably 1.3 times or more, and still more preferably 1.5 times or more and 6.0 times or less the Nb concentration in the crystal grain 61. Accordingly, the crystallization temperature of the crystal grain boundary 63 is sufficiently increased. Therefore, when the soft magnetic powder is subjected to a heat treatment, the crystallization of the crystal grain boundary 63 is prevented. As a result, coarsening of the crystal grain 61 is reduced by the crystal grain boundary 63. The Nb concentration in the crystal grain boundary 63 may exceed the above upper limit value, but the crystallization temperature of the crystal grain boundary 63 may decrease depending on a composition proportion.

The B concentration in the crystal grain boundary 63 is preferably higher than the B concentration in the crystal grain 61, more preferably 1.1 times or more, and still more preferably 1.2 times or more and 5.0 times or less the B concentration in the crystal grain 61. Accordingly, the crystallization temperature of the crystal grain boundary 63 is sufficiently increased. Therefore, when the soft magnetic powder is subjected to a heat treatment, the crystallization of the crystal grain boundary 63 is prevented. As a result, the coarsening of the crystal grain 61 is reduced by the crystal grain boundary 63. The B concentration in the crystal grain boundary 63 may exceed the above upper limit value, but the crystallization temperature of the crystal grain boundary 63 may decrease depending on a composition proportion.

The Nb concentration and the B concentration in the crystal grain boundary 63 are obtained by performing EDX analysis using STEM on an intermediate point between two adjacent crystal grains 61 in the crystal grain boundary 63, and are obtained by a quantification method based on an analysis result.

The Nb concentration and the B concentration in the crystal grain 61 are obtained by performing EDX analysis using STEM on the central portion of the crystal grain 61, and by a quantification method based on an analysis result of the EDX analysis.

1.6. Effects of Embodiment

As described above, the soft magnetic powder according to the present embodiment contains the particle 6 having a composition represented by $Fe_xCu_aNb_b(Si_{1-y}B_y)_{100-x-a-b}$. a, b, and x are numbers whose units are atomic %. 0.3≤a≤2.0, 2.0≤b≤4.0, and 72.5≤x≤75.5. y is a number satisfying f(x) ≤y≤0.99, where $f(x)=(4\times10^{-34})x^{17.56}$.

The particle 6 has the crystal grains 61, the Cu segregation portions 62, and the crystal grain boundaries 63. The crystal grain 61 has a grain size of 1.0 nm or more and 30.0 nm or less, and is a region containing the Fe—Si crystal. The Cu segregation portion 62 is a region in which Cu is segregated.

The Cu segregation portion 62 positioned in the surface layer portion 601 of the particle 6 and having a grain size of 1.0 nm or more and 5.0 nm or less is referred to as the first Cu segregation portion 621. The Cu segregation portion 62 positioned in the inner portion 602 of the particle 6 and having a grain size of 3.0 nm or more and 10.0 nm or less is referred to as the second Cu segregation portion 622. The content proportion of the crystal grains 61 in the particle 6 is 30% or more. The number proportion of the first Cu segregation portions 621 in the Cu segregation portion 62 positioned in the surface layer portion 601 is 80% or more. The number proportion of the second Cu segregation portions 622 in the Cu segregation portion 62 positioned in the inner portion 602 is 80% or more.

According to such a configuration, since the fine Cu segregation portions 62 are easily dispersed uniformly in the particle 6, the crystal grains 61 can be miniaturized and the grain sizes can be made uniform. Accordingly, a soft magnetic powder having both the high magnetic permeability at a high frequency and the low coercive force can be obtained. The particle 6 has high internal electrical resistance, and an eddy current is less likely to flow. As a result, it is possible to implement a dust core having a low iron loss and high magnetic permeability. A magnetic element excellent in electromagnetic conversion efficiency at a high frequency can be implemented.

In the soft magnetic powder according to the embodiment, it is not necessary that all particles have the above configuration, and the soft magnetic powder may include particles not having the above configuration, but it is preferable that 95 mass % or more of the particles have the above configuration.

The soft magnetic powder according to the embodiment may be mixed with another soft magnetic powder or a non-soft magnetic powder, and may be used as a mixed powder for manufacturing a dust core or the like.

1.7. Si Segregation Portion

Although not shown, the particle 6 may include a Si segregation portion in which Si is segregated. The Si segregation portion is present in the vicinity of the surface of the particle 6. In other words, the Si segregation portion is present between the Cu segregation portion 62 and the surface of the particle 6. By including the Si segregation portion present at such a position, insulating properties of the particle 6 are improved. Accordingly, it is possible to prevent occurrence of an eddy current having a path between the particles 6.

The Si segregation portion can be specified from, with respect to the cross section of the particle 6, a surface analysis image obtained by EDX analysis using STEM. Specifically, in the cross section of the particle 6, elemental analysis is performed in a range of 250 nm square including the surface, and the Si segregation portion is specified as a region in which a Si concentration is locally high. At this time, it is preferable that a range from the surface of the particle to a depth of 200 nm or more is shown in the image.

The Si concentration in the Si segregation portion is preferably 10.0 atomic % or more, more preferably 15.0 atomic % or more and 60.0 atomic % or less, and still more preferably 20.0 atomic % or more and 50.0 atomic % or less. When the Si concentration exceeds the above upper limit value, an amount of Si distributed to the crystal grains 61 is relatively reduced, and thus a high saturation magnetic flux density derived from the crystal grains 61 may be impaired. The Si concentration in the Si segregation portion is obtained as a maximum value when the Si concentration in the range shown in the image is measured by the elemental analysis by EDX.

When the particle 6 has the above composition, and particularly when a relationship between x and y is within the region shown in FIG. 4, such a Si segregation portion is likely to be formed.

1.8. Fe Concentration Distribution

In the particle 6, the Fe concentration at a position 12 nm from the surface of the particle 6 is preferably higher than an O concentration in an atomic concentration proportion. Accordingly, it is possible to implement the particle 6 in which an oxide film containing an oxide such as $SiO_2$ as a main component is prevented from becoming thicker than necessary. That is, since the amount of Si distributed in the crystal grains 61 can be secured by reducing a thickness of the oxide film to a necessary minimum and reducing an amount of Si in the oxide film, a content proportion occupied by the crystal grains 61 can be sufficiently secured. As a result, a soft magnetic powder having a higher saturation magnetic flux density and higher magnetic permeability can be obtained.

The Fe concentration and the O concentration can be specified, with respect to the cross section of the particle 6, from a surface analysis image (mapping image) and a line analysis result (line scan result) obtained by EDX analysis using STEM.

A difference between the Fe concentration and the O concentration is not particularly limited, and is preferably 10 atomic % or more, and more preferably 30 atomic % or more. An upper limit value of the difference between the Fe concentration and the O concentration is not particularly limited, and is preferably 80 atomic % or less, and more preferably 60 atomic % or less.

1.9. Various Characteristics

In the soft magnetic powder according to the embodiment, Vickers hardness of the particle 6 is preferably 1000 or more and 3000 or less, and more preferably 1200 or more and 2500 or less. When the soft magnetic powder containing the particles 6 having such hardness is compression-molded to form a dust core, deformation at a contact point between the particles 6 is reduced to a minimum. Therefore, a contact area between the particles 6 in the dust core is reduced to be small, and insulating properties between the particles 6 can be increased.

When the Vickers hardness goes below the above lower limit value, depending on an average grain size of the soft magnetic powder, when the soft magnetic powder is compression-molded, the particles 6 may be easily crushed at the contact point between the particles 6. Accordingly, the contact area between the particles 6 in the dust core increases, and the insulating properties between the particles 6 may decrease. On the other hand, when the Vickers hardness exceeds the above upper limit value, depending on the average grain size of the soft magnetic powder, powder moldability decreases, and a density at the time of forming the dust core decreases, and thus a saturation magnetic flux density and magnetic permeability of the dust core may decrease.

The Vickers hardness of the particle 6 is measured by a micro Vickers hardness tester at a central portion of the cross section of the particle 6. The central portion of the cross section of the particle 6 is a position corresponding to, when the particle 6 is cut, a midpoint of a long axis on a cut surface of the particle 6. An indentation load of an indenter during the test is 1.96 N.

An average grain size D50 of the soft magnetic powder is not particularly limited, and is preferably 1 μm or more and 50 μm or less, more preferably 5 μm or more and 45 μm or less, and still more preferably 10 μm or more and 30 μm or less. By using the soft magnetic powder having such an average grain size, it is possible to shorten a path through which an eddy current flows, and thus it is possible to manufacture a dust core capable of sufficiently reducing an eddy current loss occurred in the particles 6.

When the average grain size of the soft magnetic powder is 10 μm or more, by mixing the soft magnetic powder according to the embodiment with a soft magnetic powder having an average grain size smaller than that of the soft magnetic powder, a mixed powder capable of implementing a high powder compacting density can be prepared. This mixed powder is also an embodiment of the soft magnetic powder according to the present disclosure. According to such a mixed powder, since a grain size distribution can be easily adjusted, a filling density of the dust core can be easily increased, and the saturation magnetic flux density and magnetic permeability of the dust core can be increased.

In a volume-based grain size distribution obtained by a laser diffraction method, the average grain size D50 of the soft magnetic powder is obtained as a grain size when accumulation is 50% from a small diameter side.

When the average grain size of the soft magnetic powder goes below the above lower limit value, the soft magnetic powder is too fine, and thus filling properties of the soft magnetic powder may easily decrease. Accordingly, a molding density of the dust core, which is an example of the green compact, is reduced, and thus the saturation magnetic flux density and the magnetic permeability of the dust core may decrease depending on a material composition and mechanical properties of the soft magnetic powder. On the other hand, when the average grain size of the soft magnetic powder exceeds the above upper limit value, depending on the material composition and the mechanical properties of the soft magnetic powder, the eddy current loss occurred in the particles 6 cannot be sufficiently reduced, and the iron loss of the dust core may increase.

In the volume-based grain size distribution of the soft magnetic powder obtained by the laser diffraction method, when a grain size whose accumulation is 10% from the small diameter side is defined as D10, and a grain size whose accumulation is 90% from the small diameter side is defined as D90, (D90−D10)/D50 is preferably about 1.0 or more and 2.5 or less, and more preferably about 1.2 or more and 2.3 or less. (D90−D10)/D50 is an index indicating a degree of expansion of the grain size distribution, and when the index is within the above range, the filling properties of the soft magnetic powder are good. Therefore, a green compact having particularly high magnetic properties such as the magnetic permeability and the saturation magnetic flux density can be obtained.

The coercive force of the soft magnetic powder is not particularly limited, and is preferably less than 2.0 Oe (less than 160 A/m), and more preferably 0.1 Oe or more and 1.5 Oe or less (39.9 A/m or more and 120 A/m or less). By using a soft magnetic powder having such a small coercive force, it is possible to manufacture a dust core in which a hysteresis loss is sufficiently reduced even at a high frequency.

The coercive force of the soft magnetic powder can be measured, for example, by a vibrating sample magnetometer such as TM-VSM1230-MHHL manufactured by Tamakawa Co., Ltd.

When maximum magnetization of the soft magnetic powder is Mm [emu/g] and a true density of the particles 6 is ρ [g/cm$^3$], a saturation magnetic flux density Bs [T], i.e., $4\pi/10000\times\rho\times Mm=Bs$, is preferably 1.0 T or more, and more preferably 1.1 T or more. By using a soft magnetic powder having such a high saturation magnetic flux density, it is possible to implement a dust core which is less likely to be saturated even at a high current.

The true density p of the soft magnetic powder is measured using a full-automatic gas displacement densitometer AccuPyc 1330 manufactured by Micromeritics Instrument Corporation. The maximum magnetization Mm of the soft magnetic powder is measured using a vibrating sample magnetometer, VSM system, TM-VSM1230-MHHL manufactured by Tamakawa Co., Ltd.

The soft magnetic powder is a columnar green compact having an inner diameter of 8 mm and a mass of 0.7 g. When the green compact is compressed in an axial direction under a load of 20 kgf, a resistance value of the green compact in the axial direction is preferably 0.3 kΩ or more, and more preferably 1.0 kΩ or more. In the soft magnetic powder from which a green compact having such a resistance value can be implemented, insulating properties between particles are sufficiently secured. Therefore, such a soft magnetic powder contributes to implementation of a magnetic element capable of reducing an eddy current loss.

An upper limit value of the resistance value is not particularly limited, and is preferably 30.0 kΩ or less, and more preferably 9.0 kΩ or less in consideration of a reduction in variation or the like.

2. Method for Manufacturing Soft Magnetic Powder

Next, a method for manufacturing a soft magnetic powder will be described.

The soft magnetic powder may be manufactured by any manufacturing method, and is manufactured by, for example, performing a crystallization treatment on a metal powder manufactured by various powdering methods such as an atomization method such as a water atomization method, a gas atomization method, and a rotary water atomization method, a reduction method, a carbonyl method, and a pulverization method.

Examples of the atomization method include, depending on a type of a cooling medium or a device configuration, a water atomization method, a gas atomization method, and a rotary water atomization method. The soft magnetic powder is preferably manufactured by an atomization method, more preferably manufactured by a water atomization method or a rotary water atomization method, and still more preferably manufactured by a rotary water atomization method. The atomization method is a method for manufacturing a powder by causing a molten metal to collide with a fluid such as a liquid or a gas injected at a high speed so as to pulverize and cool the molten metal. By using such an atomization method, a large cooling rate can be obtained, and thus amorphization can be promoted. As a result, crystal grains having a more uniform grain size can be formed by a heat treatment.

The "water atomization method" in the present specification refers to a method in which a liquid such as water or oil is used as a coolant, and in a state where the liquid is injected in an inverted conical shape which converges on one point, the molten metal is caused to flow downward a convergence point and to collide with the convergence point, so that the molten metal is pulverized to manufacture a metal powder.

According to the rotary water atomization method, since the molten metal can be cooled at an extremely high speed, solidification can be achieved with a high degree of disordered atomic arrangement maintained in the molten metal. Therefore, by performing a crystallization treatment thereafter, it is possible to efficiently manufacture a metal powder containing crystal grains having a uniform grain size.

Hereinafter, the method for manufacturing the metal powder by the rotary water atomization method will be further described.

In the rotary water atomization method, a coolant is injected and supplied along an inner circumferential surface of a cooling tubular body and swirled along the inner circumferential surface of the cooling tubular body to form a coolant layer at the inner circumferential surface. On the other hand, a raw material of the metal powder is melted, and a liquid or gas jet is sprayed to the obtained molten metal while the molten metal naturally drops. Accordingly, the molten metal is scattered, and the scattered molten metal is taken into the coolant layer. As a result, the scattered and pulverized molten metal is rapidly cooled and solidified to obtain a metal powder.

Figure 5:
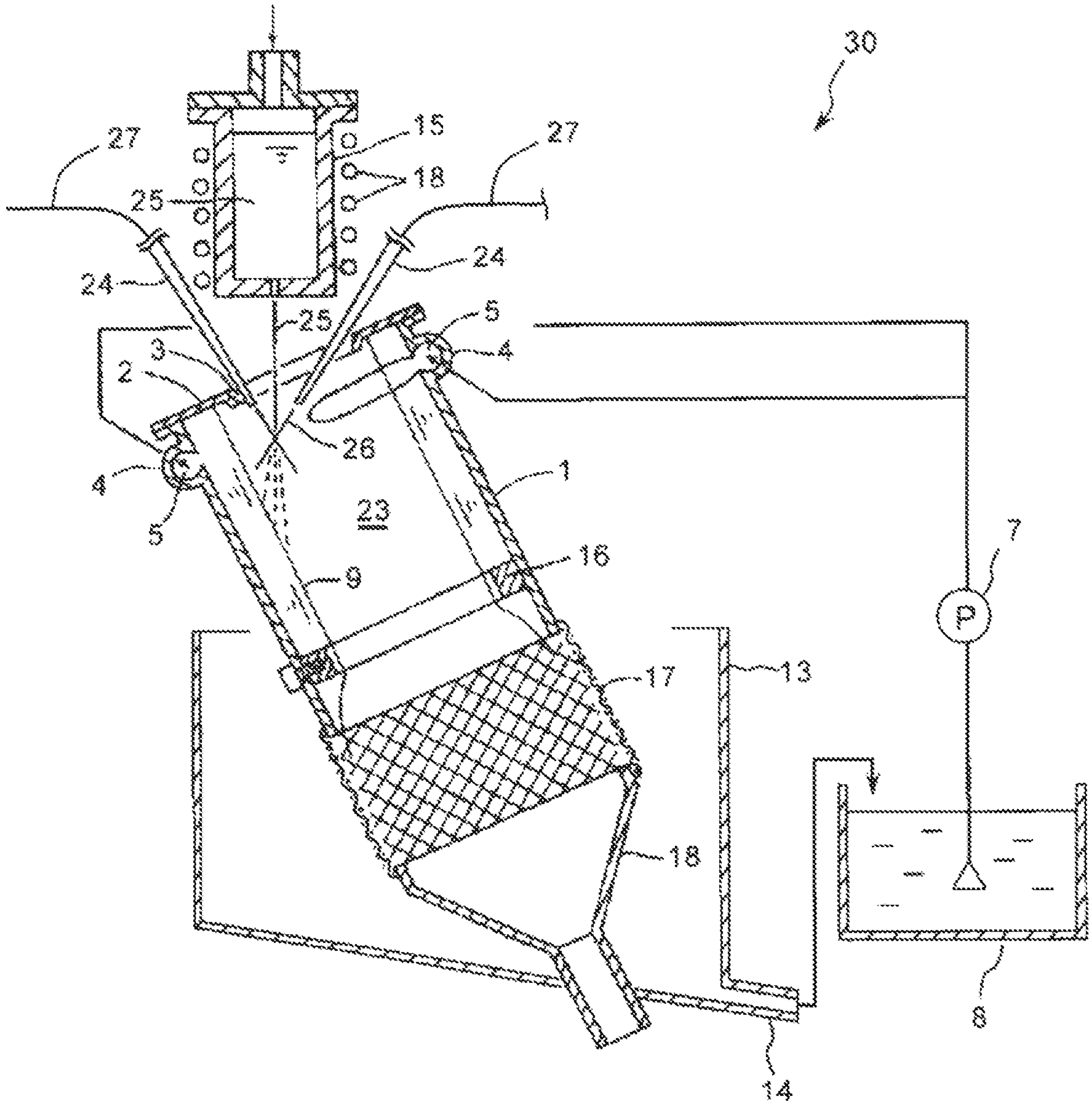
FIG. 5 is a longitudinal sectional view showing an example of a device which manufactures a metal powder by a rotary water atomization method.

FIG. 5 is a longitudinal sectional view showing an example of a device which manufactures a metal powder by a rotary water atomization method.

A powder manufacturing device 30 shown in FIG. 5 includes a cooling tubular body 1, a crucible 15, a pump 7, and a jet nozzle 24. The cooling tubular body 1 is a tubular body for forming a coolant layer 9 at an inner circumferential surface of the cooling tubular body 1. The crucible 15 is a supply container for causing a molten metal 25 to flow down and for supplying the molten metal 25 to a space portion 23 inside the coolant layer 9. The pump 7 supplies a coolant to the cooling tubular body 1. The jet nozzle 24 injects a gas jet 26 for dividing the flowing down molten metal 25 in the form of a minute flow into liquid droplets. The molten metal 25 is prepared according to the composition of the soft magnetic powder.

The cooling tubular body 1 has a cylindrical shape, and is provided such that a tubular body axis line extends along a vertical direction or is inclined at an angle of 30° or less with respect to the vertical direction.

An upper end opening of the cooling tubular body 1 is closed by a lid body 2. An opening portion 3 for supplying the molten metal 25 flowing down to the space portion 23 of the cooling tubular body 1 is formed in the lid body 2.

A coolant injecting pipe 4 for injecting the coolant to the inner circumferential surface of the cooling tubular body 1 is provided in an upper portion of the cooling tubular body 1. A plurality of discharge ports 5 of the coolant injecting pipe 4 are provided at equal intervals along a circumferential direction of the cooling tubular body 1.

The coolant injecting pipe 4 is coupled to a tank 8 via pipes to which the pump 7 is coupled, and the coolant in the tank 8 sucked up by the pump 7 is injected and supplied via the coolant injecting pipe 4 into the cooling tubular body 1. Accordingly, the coolant gradually flows down while rotating along the inner circumferential surface of the cooling tubular body 1, and accordingly, the coolant layer 9 along the inner circumferential surface is formed. A cooler may be interposed as necessary in the tank 8 or in a middle of a circulation flow path. As the coolant, in addition to water, oil such as silicone oil is used, and various additives may be further added. By removing dissolved oxygen in the coolant in advance, it is possible to prevent oxidation associated with cooling of the manufactured powder.

A layer thickness adjusting ring 16 for adjusting a layer thickness of the coolant layer 9 is detachably provided at a lower portion of the inner circumferential surface of the cooling tubular body 1. By providing the layer thickness adjusting ring 16, a downflow rate of the coolant is reduced, the layer thickness of the coolant layer 9 can be secured, and the layer thickness can be made uniform.

Further, a cylindrical liquid draining mesh body 17 is continuously provided at a lower portion of the cooling tubular body 1, and a funnel-shaped powder recovery container 18 is provided at a lower side of the liquid draining mesh body 17. A coolant recovery cover 13 is provided around the liquid draining mesh body 17 so as to cover the liquid draining mesh body 17, and a drain port 14 formed in a bottom portion of the coolant recovery cover 13 is coupled via a pipe to the tank 8.

The jet nozzle 24 is provided in the space portion 23. The jet nozzle 24 is attached to a tip end of a gas supply pipe 27 and is inserted through the opening portion 3 of the lid body 2 into the cooling tubular body 1, and an injection port of the jet nozzle 24 is directed to the molten metal 25 in the form of a minute flow.

In order to manufacture a metal powder in such a powder manufacturing device 30, first, the pump 7 is operated to form the coolant layer 9 at the inner circumferential surface of the cooling tubular body 1. Next, the molten metal 25 in the crucible 15 is caused to flow down into the space portion 23. When the gas jet 26 is sprayed to the molten metal 25 flowing down, the molten metal 25 is scattered, and the pulverized molten metal 25 is caught in the coolant layer 9. As a result, the pulverized molten metal 25 is cooled and solidified to obtain a metal powder.

In the rotary water atomization method, a coolant is continuously supplied to stably maintain an extremely high cooling rate, so that an amorphous state of the manufactured metal powder before a heat treatment is stabilized. As a result, it is possible to efficiently manufacture, by performing a crystallization treatment thereafter, a soft magnetic powder containing crystal grains having a uniform grain size.

Since the molten metal 25 miniaturized to a certain size by the gas jet 26 falls by inertia until the molten metal 25 is caught in the coolant layer 9, liquid droplets are made spherical at that time.

For example, a downflow amount of the molten metal 25 flowing down from the crucible 15 varies depending on a size of the device and is not particularly limited, and is preferably reduced to 1 kg or less per minute. Accordingly, when the molten metal 25 is scattered, the molten metal 25 is scattered as liquid droplets having an appropriate size, and thus a soft magnetic powder having the average grain size as described above can be obtained. Since an amount of the molten metal 25 supplied for a certain period of time is reduced to some extent, a sufficient cooling rate can also be obtained. For example, by reducing the downflow amount of the molten metal 25 within the above range, it is possible to make adjustments such as reducing an average grain size of the metal powder.

On the other hand, an outer diameter of the minute flow of the molten metal 25 flowing down from the crucible 15, that is, an inner diameter of a downflow port of the crucible 15 is not particularly limited, and is preferably 1 mm or less. Accordingly, the gas jet 26 can easily and uniformly hit the minute flow of the molten metal 25, and thus liquid droplets having an appropriate size are more likely to uniformly scatter. As a result, a metal powder having the average grain size as described above can be obtained. Since the amount of the molten metal 25 supplied for a certain period of time is reduced, the cooling rate is increased.

A flow rate of the gas jet 26 is not particularly limited, and is preferably set to 100 m/s or more and 1000 m/s or less. Accordingly, the molten metal 25 can also be scattered as liquid droplets having an appropriate size, and thus a metal powder having the average grain size as described above can be obtained. Since the gas jet 26 has a sufficient flow rate, a sufficient flow rate is applied to the scattered liquid droplets, the liquid droplets become finer, and a time required for the liquid droplets to be caught in the coolant layer 9 is shortened. As a result, the liquid droplets can be made spherical in a short time, and are cooled in a short time. For example, the average grain size of the metal powder can be adjusted to be small by increasing the flow rate of the gas jet 26 within the above range.

As other conditions, for example, it is preferable that a pressure at the time of injecting the coolant supplied to the cooling tubular body 1 is set to about 50 MPa or more and 200 MPa or less, and that a liquid temperature at the time of injecting the coolant supplied to the cooling tubular body 1 is set to about −10° C. or higher and 40° C. or lower. Accordingly, a flow rate of the coolant layer 9 can be optimized, and the pulverized molten metal 25 can be appropriately and uniformly cooled.

A temperature of the molten metal 25 is preferably set to, with respect to a melting point Tm of the metal powder to be manufactured, about Tm+20° C. or higher and Tm+200° C. or lower, and more preferably set to about Tm+50° C. or higher and Tm+150° C. or lower. Accordingly, when the molten metal 25 is pulverized by the gas jet 26, variations in characteristics among particles can be reduced to be particularly small, and the amorphization of the metal powder to be manufactured before a heat treatment can be more reliably achieved.

The gas jet 26 may be replaced with a liquid jet as necessary.

The cooling rate during cooling of the molten metal 25 in an atomization method is preferably $1\times10^{4}$° C./s or more, more preferably $1\times10^{5}$° C./s or more, and still more preferably $1\times10^{6}$° C./s or more. By such rapid cooling, particularly stable amorphization can be achieved, and finally, a soft magnetic powder containing crystal grains having a uniform grain size can be obtained. It is possible to reduce a variation in a composition proportion among the particles of the soft magnetic powder. By increasing the cooling rate, the above Fe concentration can be increased to be higher than the O concentration.

The metal powder manufactured as described above is subjected to a crystallization treatment. Accordingly, at least a part of the amorphous structure is crystallized to form crystal grains.

The crystallization treatment can be performed by subjecting a metal powder having an amorphous structure to a heat treatment. A temperature in the heat treatment is not particularly limited, and is preferably 520° C. or higher and 640° C. or lower, more preferably 530° C. or higher and 630° C. or lower, and still more preferably 540° C. or higher and 620° C. or lower. A time in the heat treatment, which is a time for maintaining the above temperature, is preferably 1 minute or longer and 180 minutes or shorter, more preferably 3 minutes or longer and 120 minutes or shorter, and still more preferably 5 minutes or longer and 60 minutes or shorter. By setting the temperature and the time in the heat treatment to be within the above ranges, crystal grains having a more uniform grain size can be generated.

When the temperature or the time in the heat treatment goes below the above lower limit value, depending on the composition or the like of the metal powder, the crystallization may be insufficient and the uniformity of the grain sizes may be deteriorated. On the other hand, when the temperature or the time in the heat treatment exceeds the above upper limit value, depending on the composition or the like of the metal powder, the crystallization may excessively proceed and the uniformity of the grain sizes may be deteriorated.

A temperature raising rate and a temperature drop rate in the crystallization treatment affect the grain size and the uniformity of the grain sizes of the crystal grains generated by the heat treatment, a distribution of the Cu segregation portions, the grain size and the Cu concentration in the Cu segregation portion, and the Nb concentration and the B concentration in the crystal grain boundary.

The temperature raising rate is preferably 10° C./min or more and 35° C./min or less, more preferably 10° C./min or more and 30° C./min or less, and still more preferably 15° C./min or more and 25° C./min or less. By setting the temperature raising rate to be within the above ranges, the distribution of the Cu segregation portions, the grain size and the Cu concentration in the Cu segregation portion can be made to fall within the above ranges, and the Nb concentration and the B concentration in the crystal grain boundary can be made to fall within the above ranges. Accordingly, the grain sizes and the content proportion of the crystal grains can also be made to fall within the above ranges. When the temperature raising rate goes below the above lower limit value, although a time for exposure to a high temperature becomes longer to some extent, the grain size of the Cu segregation portion may not become large, and the Nb concentration and the B concentration in the crystal grain boundary may not be sufficiently increased. Therefore, the content proportion of the crystal grains may increase, and the grain size of the crystal grain may become too large. When the temperature raising rate exceeds the above upper limit value, although the time for exposure to a high temperature becomes short, the grain size of the Cu segregation portion may become large, and the Nb concentration and the B concentration in the crystal grain boundary may increase more than necessary. Therefore, the content proportion of the crystal grains may decrease. Further, the distribution of the Cu segregation portions may become too shallow or the Cu concentration in the Cu segregation portion may become too low.

The temperature drop rate is preferably 40° C./min or more and 80° C./min or less, more preferably 50° C./min or more and 70° C./min or less, and still more preferably 55° C./min or more and 65° C./min or less. By setting the temperature drop rate to be within the above ranges, the distribution of the Cu segregation portions, the grain size and the Cu concentration in the Cu segregation portion can be made to fall within the above ranges, and the Nb concentration and the B concentration in the crystal grain boundary can be made to fall within the above ranges. Accordingly, the grain sizes and the content proportion of the crystal grains can also be made to fall within the above ranges. When the temperature drop rate goes below the above lower limit value, although a time for exposure to a high temperature becomes longer to some extent, the grain size of the Cu segregation portion may become small, and the Nb concentration and the B concentration in the crystal grain boundary may not be sufficiently increased. Therefore, the content proportion of the crystal grains may increase, and the grain size of the crystal grain may become too large. When the temperature drop rate exceeds the above upper limit value, although the time for exposure to a high temperature becomes short, the grain size of the Cu segregation portion may become large, and the Nb concentration and the B concentration in the crystal grain boundary may increase more than necessary. Therefore, the content proportion of the crystal grains may decrease. Further, the distribution of the Cu segregation portions may become too shallow or the Cu concentration in the Cu segregation portion may become too low.

An atmosphere in the crystallization treatment is not particularly limited, and is preferably an inert gas atmosphere such as nitrogen or argon, a reducing gas atmosphere such as hydrogen or ammonia decomposition gas, or a reduced-pressure atmosphere thereof. Accordingly, it is possible to crystallize the metal while preventing oxidation of the metal, and it is possible to obtain a soft magnetic powder having excellent magnetic properties.

In this way, the soft magnetic powder according to the present embodiment can be manufactured.

The soft magnetic powder thus obtained may be classified as necessary. Examples of a classification method include dry classification such as sieving classification, inertial classification, centrifugal classification, and wind classification, and wet classification such as sedimentation classification.

An insulating film may be formed at a surface of the particle of the obtained soft magnetic powder as necessary. Examples of a constituent material of the insulating film include inorganic materials such as phosphates such as magnesium phosphate, calcium phosphate, zinc phosphate, manganese phosphate, and cadmium phosphate, and silicates such as sodium silicate. An organic material may be appropriately selected from organic materials listed as constituent materials of a binder to be described later.

3. Dust Core and Magnetic Element

Next, a dust core and a magnetic element according to the embodiment will be described.

The magnetic element according to the embodiment can be applied to various magnetic elements including a magnetic core, such as a choke coil, an inductor, a noise filter, a reactor, a transformer, a motor, an actuator, an electromagnetic valve, and a generator. The dust core according to the embodiment can be applied to magnetic cores in these magnetic elements.

Hereinafter, two types of coil components will be representatively described as examples of the magnetic element.

3.1. Toroidal Type

First, a toroidal type coil component, which is an example of the magnetic element according to the embodiment, will be described.

Figure 6:
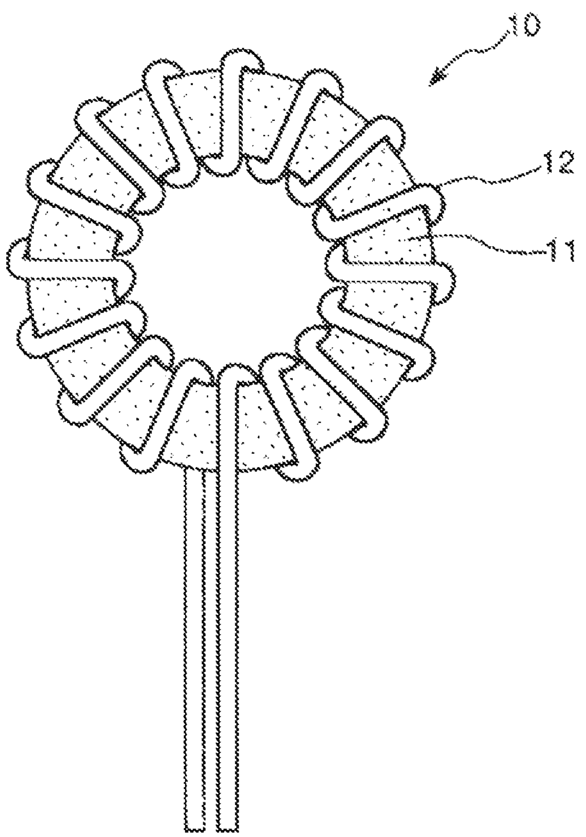
FIG. 6 is a plan view schematically showing a toroidal type coil component.

FIG. 6 is a plan view schematically showing the toroidal type coil component.

A coil component 10 shown in FIG. 6 includes a ring-shaped dust core 11 and a conductive wire 12 wound around the dust core 11. Such a coil component 10 is generally referred to as a toroidal coil.

The dust core 11 is obtained by mixing the soft magnetic powder according to the embodiment and a binder, supplying the obtained mixture to a mold, and pressing and molding the mixture. That is, the dust core 11 is a green compact containing the soft magnetic powder according to the embodiment. Such a dust core 11 has a high saturation magnetic flux density, high magnetic permeability, and a low iron loss. As a result, when the dust core 11 is mounted on an electronic device or the like, power consumption of the electronic device or the like can be reduced and high performance can be achieved, thereby contributing to improvement in reliability of the electronic device or the like.

The binder may be added as necessary, and may be omitted.

Magnetic permeability of the dust core 11 measured at a measurement frequency of 100 MHz is preferably 18.0 or more, and more preferably 19.5 or more. According to such a dust core 11, a magnetic element having excellent DC superimposition characteristics and high electromagnetic conversion efficiency at a high frequency can be implemented. When the magnetic permeability is measured, the dust core 11 is formed into a ring shape having an outer diameter of 14 mm, an inner diameter of 8 mm, and a thickness of 3 mm by compacting a soft magnetic powder at a molding pressure of 294 MPa (3 $t/cm^2$), and the magnetic permeability is measured in a state where a conductive wire having a wire diameter of 0.6 mm is wound 7 times around the dust core 11.

The magnetic permeability of the dust core 11 is relative permeability obtained based on self-inductance of a closed magnetic circuit magnetic core coil, that is, effective permeability. For measurement of the magnetic permeability, for example, an impedance analyzer such as 4194A manufactured by Agilent Technologies, Inc. is used. A winding number of a winding is 7 times, and a wire diameter of the winding is 0.6 mm.

An iron loss of the dust core 11 measured at a maximum magnetic flux density of 50 mT and a measurement frequency of 900 kHz is preferably 9000 $kW/m^3$ or less, more preferably 7000 $kW/m^3$ or less, and still more preferably 6500 $kW/m^3$ or less. According to such a dust core 11, a magnetic element having high electromagnetic conversion efficiency at a high frequency can be implemented. When the iron loss is measured, the dust core 11 is formed into a ring shape having an outer diameter of 14 mm, an inner diameter of 8 mm, and a thickness of 3 mm by compacting a soft magnetic powder at a molding pressure of 294 MPa (3 $t/cm^2$), and the iron loss is measured in a state where a conductive wire having a wire diameter of 0.5 mm is wound 36 times around the dust core 11 on each of a primary side and a secondary side.

The coil component 10 including such a dust core 11 has a low iron loss and high performance.

Examples of a constituent material of the binder used for preparing the dust core 11 include organic materials such as silicone-based resins, epoxy-based resins, phenol-based resins, polyamide-based resins, polyimide-based resins, and polyphenylene sulfide-based resins, and inorganic materials such as phosphates such as magnesium phosphate, calcium phosphate, zinc phosphate, manganese phosphate, and cadmium phosphate, and silicates such as sodium silicate. In particular, the constituent material of the binder is preferably a thermosetting polyimide or an epoxy-based resin. The resin materials are easily cured by being heated and have excellent heat resistance. Therefore, manufacturability of the dust core 11 can be easily improved and the heat resistance of the dust core 11 can be improved.

A proportion of the binder with respect to the soft magnetic powder slightly varies depending on a target magnetic flux density and mechanical properties of the dust core 11 to be prepared, an acceptable eddy current loss, and the like, and is preferably about 0.5 mass % or more and 5 mass % or less, and more preferably about 1 mass % or more and 3 mass % or less. Accordingly, it is possible to obtain the dust core 11 having excellent magnetic properties such as the magnetic flux density and the magnetic permeability while sufficiently binding the particles of the soft magnetic powder to each other.

Various additives may be added to the mixture as necessary for any purpose.

Examples of a constituent material of the conductive wire 12 include a material having high conductivity, for example, a metal material containing Cu, Al, Ag, Au, and Ni. An insulating film is provided as necessary at a surface of the conductive wire 12.

A shape of the dust core 11 is not limited to the ring shape shown in FIG. 6, and may be, for example, a shape in which a part of the ring is missing, or a shape in which a shape in a longitudinal direction is linear.

The dust core 11 may contain, as necessary, a soft magnetic powder other than the soft magnetic powder according to the embodiment described above, or a non-magnetic powder.

3.2. Closed Magnetic Circuit Type

Next, a closed magnetic circuit type coil component, which is an example of the magnetic element according to the embodiment, will be described.

Figure 7:
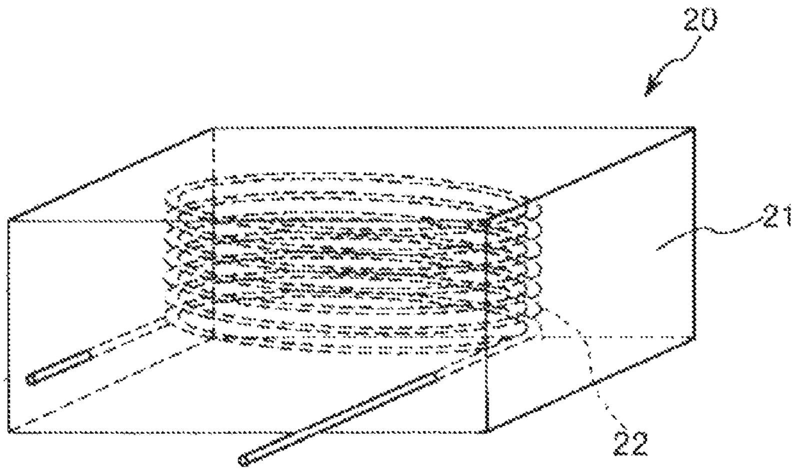
FIG. 7 is a transparent perspective view schematically showing a closed magnetic circuit type coil component.

FIG. 7 is a transparent perspective view schematically showing the closed magnetic circuit type coil component.

Hereinafter, the closed magnetic circuit type coil component will be described. In following description, differences from the toroidal type coil component will be mainly described, and description of similar matters is omitted.

As shown in FIG. 7, a coil component 20 according to the present embodiment is formed by embedding a conductive wire 22 formed in a coil shape in a dust core 21. That is, the coil component 20 is formed by molding the conductive wire 22 with the dust core 21. The dust core 21 has a configuration similar to that of the dust core 11 described above.

The coil component 20 in such a form can be easily obtained in a relatively small size. When such a small coil component 20 is manufactured, by using the dust core 21 having a large magnetic flux density, large magnetic permeability, and a low loss (core loss), it is possible to obtain the coil component 20 having a low loss and low heat generation which can cope with a large current even with a small size.

Since the conductive wire 22 is embedded in the dust core 21, a gap is less likely to be formed between the conductive wire 22 and the dust core 21. Therefore, vibration due to magnetostriction of the dust core 21 can be prevented, and occurrence of noise due to the vibration can also be prevented.

When manufacturing the coil component 20 according to the present embodiment as described above, first, the conductive wire 22 is disposed in a cavity of a mold, and an inside of the cavity is filled with granulated powders containing the soft magnetic powders according to the embodiment. That is, the inside of the cavity is filled with the granulated powders so as to include the conductive wire 22.

Next, the granulated powders are pressurized together with the conductive wire 22 to obtain a molded product.

Next, the molded product is subjected to a heat treatment similar to the above-described embodiment. Accordingly, a binder is cured, and the dust core 21 and the coil component 20 can be obtained.

The dust core 21 may contain, as necessary, a soft magnetic powder other than the soft magnetic powder according to the embodiment described above or a non-magnetic powder.

4. Electronic Device

Next, an electronic device including the magnetic element according to the embodiment will be described with reference to FIGS. 8 to 10.

Figure 8:
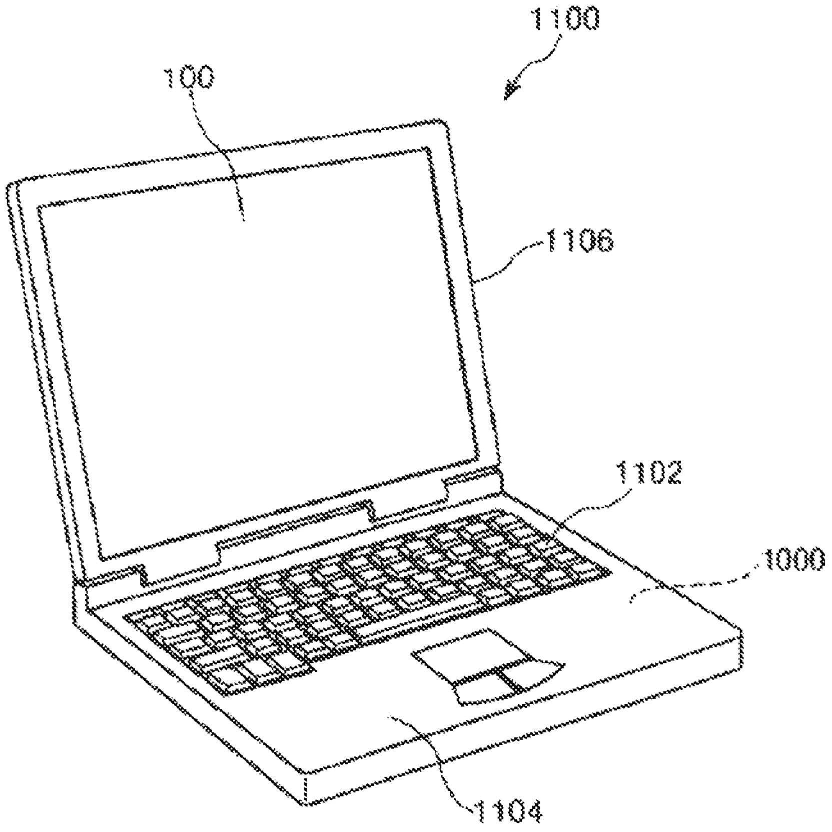
FIG. 8 is a perspective view showing a mobile personal computer which is an electronic device including a magnetic element according to the embodiment.

FIG. 8 is a perspective view showing a mobile personal computer which is an electronic device including the magnetic element according to the embodiment. A personal computer 1100 shown in FIG. 8 includes a main body 1104 including a keyboard 1102 and a display unit 1106 including a display 100. The display unit 1106 is rotatably supported by the main body 1104 via a hinge structure. Such a personal computer 1100 is embedded with a magnetic element 1000 such as a choke coil or an inductor for a switching power supply, or a motor.

Figure 9:
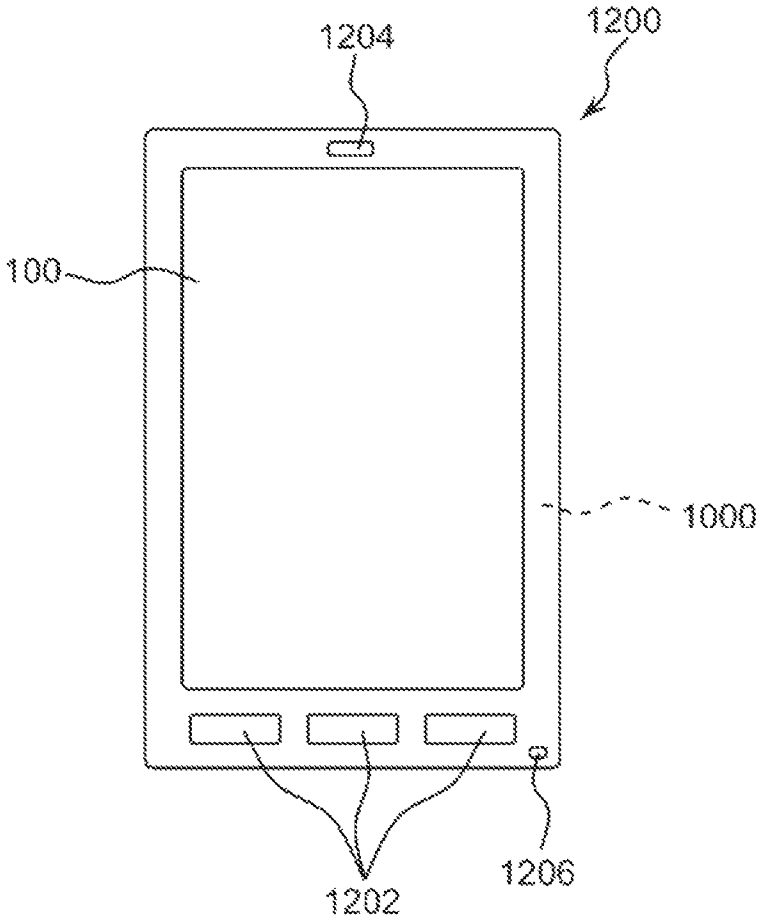
FIG. 9 is a plan view showing a smartphone which is an electronic device including the magnetic element according to the embodiment.

FIG. 9 is a plan view showing a smartphone which is an electronic device including the magnetic element according to the embodiment. A smartphone 1200 shown in FIG. 9 includes a plurality of operation buttons 1202, an earpiece 1204, and a mouthpiece 1206. The display 100 is disposed between the operation buttons 1202 and the earpiece 1204. Such a smartphone 1200 is embedded with the magnetic element 1000 such as an inductor, a noise filter, and a motor.

Figure 10:
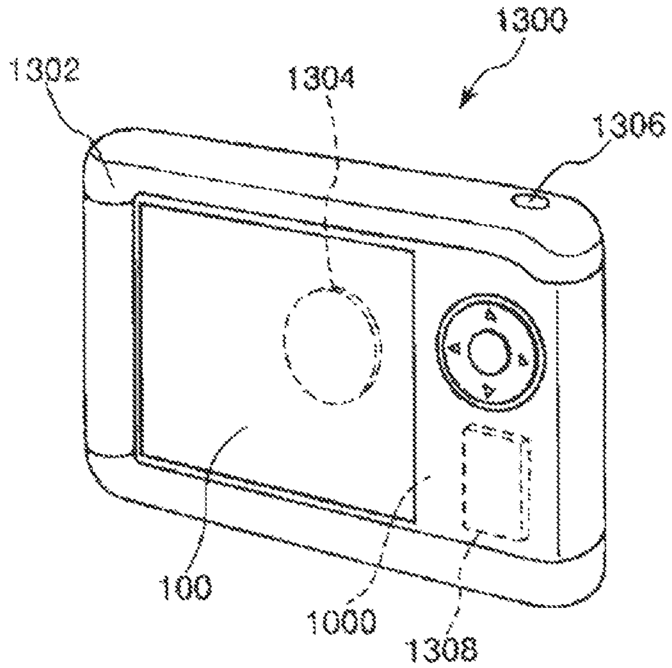
FIG. 10 is a perspective view showing a digital still camera which is an electronic device including the magnetic element according to the embodiment.

FIG. 10 is a perspective view showing a digital still camera which is an electronic device including the magnetic element according to the embodiment. The digital still camera 1300 photoelectrically converts an optical image of a subject by an imaging element such as a charge coupled device (CCD) to generate an imaging signal.

The digital still camera 1300 shown in FIG. 10 includes the display 100 provided at a rear surface of a case 1302. The display 100 functions as a finder which displays the subject as an electronic image. A light receiving unit 1304 including an optical lens, a CCD, and the like is provided on a front surface side of the case 1302, that is, on a rear surface side in the drawing.

When a photographer confirms a subject image displayed on the display 100 and presses a shutter button 1306, an imaging signal of the CCD at that time is transferred to and stored in a memory 1308. Such a digital still camera 1300 is also embedded with the magnetic element 1000 such as an inductor and a noise filter.

Examples of the electronic device according to the embodiment include, in addition to the personal computer in FIG. 8, the smartphone in FIG. 9, and the digital still camera in FIG. 10, for example, a mobile phone, a tablet terminal, a watch, ink jet discharge devices such as an ink jet printer, a laptop personal computer, a television, a video camera, a video tape recorder, a car navigation device, a pager, an electronic notebook, an electronic dictionary, a calculator, an electronic game device, a word processor, a workstation, a videophone, a crime prevention television monitor, electronic binoculars, a POS terminal, medical devices such as an electronic thermometer, a blood pressure meter, a blood glucose meter, an electrocardiogram measurement device, an ultrasonic diagnostic device, and an electronic endoscope, a fish finder, various measuring devices, instruments for a vehicle, an aircraft, and a ship, moving object control devices such as an automobile control device, an aircraft control device, a railway vehicle control device, and a ship control device, and a flight simulator.

As described above, such an electronic device includes the magnetic element 1000 according to the embodiment. Accordingly, effects of the magnetic element such as a low coercive force and a high saturation magnetic flux density can be exerted, and a size of the electronic device can be reduced and an output of the electronic device can be increased.

The soft magnetic powder, the dust core, the magnetic element, and the electronic device according to the present disclosure are described above based on the preferred embodiment, but the present disclosure is not limited thereto.

For example, in the above embodiment, the green compact such as the dust core is described as an application example of the soft magnetic powder according to the present disclosure, but the application example is not limited thereto. The soft magnetic powder may be a magnetic device such as a magnetic fluid, a magnetic viscoelastic elastomer composition, a magnetic head, and an electromagnetic wave shielding member.

Shapes of the dust core and the magnetic element are not limited to shapes shown in the drawings, and may be any shapes.

EXAMPLES

Next, specific Examples of the present disclosure will be described.

5. Manufacturing of Dust Core

5.1. Sample No. 1

First, a raw material was melted in a high-frequency induction furnace and pulverized by a rotary water atomization method to obtain a metal powder. At this time, a downflow amount of the molten metal flowing down from a crucible was set to 0.5 kg/min, an inner diameter of a downflow port of the crucible was set to 1 mm, and a flow rate of a gas jet was set to 900 m/s. Next, classification was performed by an air classifier. A composition of the obtained metal powder is shown in Table 1. For specifying the composition, a solid emission spectrometer, model: SPECTROLAB, type: LAVMB08A manufactured by SPECTRO, was used. As a result, a total content proportion of impurities was 0.50 atomic % or less.

Next, the grain size distribution of the obtained metal powder was measured. This measurement was performed by using a Microtrac HRA9320-X100, manufactured by Nikkiso Co., Ltd, i.e., a laser diffraction grain size distribution measuring device. The average grain size D50 of the metal powder was obtained based on the grain size distribution and was 20 μm. The obtained metal powder was evaluated by an X-ray diffractometer to determine whether a structure before a heat treatment was amorphous.

Next, the obtained metal powder was heated in a nitrogen atmosphere. Accordingly, a soft magnetic powder was obtained. Heating conditions are as shown in Table 1.

Next, the obtained soft magnetic powder and an epoxy resin as a binder were mixed to obtain a mixture. An addition amount of the epoxy resin was 2 parts by mass with respect to 100 parts by mass of the metal powder.

Next, the obtained mixture was stirred and then dried for a short time to obtain a massive dried body. Next, the dried body was sieved with a sieve having an opening of 400 μm, and the dried body was pulverized to obtain granulated powders. The obtained granulated powders were dried at 50° C. for 1 hour.

Next, a mold is filled with the obtained granulated powders, and a molded product was obtained based on the following molding conditions.

Molding Conditions

Molding method: press molding

Shape of molded product: ring shape

Dimensions of molded product: outer diameter: 14 mm, inner diameter: 8 mm, thickness: 3 mm Molding pressure: 3 t/cm$^2$ (294 MPa)

Next, the molded product was heated in an air atmosphere at a temperature of 150° C. for 0.5 hour to cure the binder. Accordingly, a dust core was obtained.

5.2. Sample Nos. 2 to 16

A dust core was obtained in the same manner as in Sample No. 1 except that manufacturing conditions of the soft magnetic powder and manufacturing conditions of the dust core were changed as shown in Table 1.

TABLE 1

| Sample No. | Example/ Comparative Example | Atomization method | Composition of soft magnetic powder: Fe x | Cu a | Nb b | Si | B | Total | Si + B |
|---|---|---|---|---|---|---|---|---|---|
| | | | atomic % | | | | | atomic % | |
| No. 1 | Comparative Example | Rotary water | 73.5 | 1.0 | 3.0 | 18.0 | 4.5 | 100 | 22.5 |
| No. 2 | Example | Rotary water | 73.5 | 1.0 | 3.0 | 15.8 | 6.8 | 100 | 22.5 |
| No. 3 | Example | Rotary water | 73.5 | 1.0 | 3.0 | 13.5 | 9.0 | 100 | 22.5 |
| No. 4 | Example | Rotary water | 73.5 | 1.0 | 3.0 | 11.3 | 11.3 | 100 | 22.5 |
| No. 5 | Example | Rotary water | 73.5 | 1.0 | 3.0 | 9.0 | 13.5 | 100 | 22.5 |
| No. 6 | Example | Rotary water | 73.5 | 1.0 | 3.0 | 6.8 | 15.8 | 100 | 22.5 |
| No. 7 | Example | Rotary water | 75.0 | 1.0 | 3.0 | 6.3 | 14.7 | 100 | 21.0 |
| No. 8 | Comparative Example | Rotary water | 77.0 | 1.0 | 3.0 | 9.5 | 9.5 | 100 | 19.0 |
| No. 9 | Comparative Example | Rotary water | 79.0 | 1.0 | 3.0 | 5.1 | 11.9 | 100 | 17.0 |
| No. 10 | Comparative Example | Rotary water | 80.0 | 1.0 | 3.0 | 1.6 | 14.4 | 100 | 16.0 |
| No. 11 | Comparative Example | Rotary water | 73.5 | 1.0 | 3.0 | 9.2 | 13.3 | 100 | 22.5 |
| No. 12 | Comparative Example | Rotary waler | 73.5 | 1.0 | 3.0 | 9.2 | 13.3 | 100 | 22.5 |
| No. 13 | Comparative Example | Rotary water | 73.5 | 1.0 | 3.0 | 9.2 | 13.3 | 100 | 22.5 |
| No. 14 | Comparative Example | Rotary water | 73.5 | 1.0 | 3.0 | 9.2 | 13.3 | 100 | 22.5 |
| No. 15 | Comparative Example | Water | 73.5 | 1.0 | 3.0 | 9.2 | 13.3 | 100 | 22.5 |
| No. 16 | Comparative Example | Water | 73.5 | 1.0 | 3.0 | 9.2 | 13.3 | 100 | 22.5 |

| Sample No. | Composition of soft magnetic powder: B/(Si + B) y — | Region — | Metal powder structure before heat treatment | Heat treatment: Heat temperature ° C. | Temperature raising rate ° C./min | Temperature drop rate ° C./min |
|---|---|---|---|---|---|---|
| No. 1 | 0.20 | — | Crystal | 560 | 15 | 55 |
| No. 2 | 0.30 | B | Amorphous | 580 | 15 | 55 |
| No. 3 | 0.40 | C | Amorphous | 560 | 15 | 55 |
| No. 4 | 0.50 | C | Amorphous | 560 | 15 | 55 |
| No. 5 | 0.60 | C | Amorphous | 560 | 15 | 55 |
| No. 6 | 0.70 | C | Amorphous | 560 | 15 | 55 |
| No. 7 | 0.70 | B | Amorphous | 560 | 15 | 55 |
| No. 8 | 0.50 | — | Crystal | 540 | 25 | 65 |
| No. 9 | 0.70 | — | Crystal | 540 | 25 | 65 |
| No. 10 | 0.90 | — | Crystal | 540 | 25 | 65 |
| No. 11 | 0.59 | C | Amorphous | 560 | 5 | 60 |
| No. 12 | 0.59 | C | Amorphous | 560 | 20 | 30 |
| No. 13 | 0.59 | C | Amorphous | 560 | 45 | 60 |

TABLE 1-continued

| | | | | | | |
|---|---|---|---|---|---|---|
| No. 14 | 0.59 | C | Amorphous | 560 | 20 | 90 |
| No. 15 | 0.59 | C | Amorphous | 560 | 20 | 30 |
| No. 16 | 0.59 | C | Amorphous | 560 | 20 | 30 |

In Table 1, among soft magnetic powders of the respective sample Nos., soft magnetic powders corresponding to the present disclosure are shown as "Examples", and soft magnetic powders not corresponding to the present disclosure are shown as "Comparative Examples".

When x and y in a composition of the soft magnetic powder in each sample No. were positioned inside the region C, "C" was written in a region column, when x and y were positioned outside the region C and inside the region B, "B" was written in the region column, and when x and y were positioned outside the region B and inside the region A, "A" was written in the region column. When x and y were positioned outside the region A, "–" was written in the region column.

6. Evaluation of Soft Magnetic Powder and Dust Core

6.1. Evaluation of Particle of Soft Magnetic Powder

Particles of the soft magnetic powders obtained in Examples and Comparative Examples were processed into thin pieces by a focused ion beam apparatus to obtain a test piece.

Next, the obtained test piece was observed using a scanning transmission electron microscope and was subjected to elemental analysis to obtain a surface analysis image.

Next, a grain size of a crystal grain containing a Fe—Si crystal was measured from an observation image, and a content proportion of crystal grains in the range of 1.0 nm or more and 30.0 nm or less was calculated. Calculation results are shown in Table 2.

By analyzing the surface analysis image, various indexes shown in Table 2 or Table 3 were obtained for the first Cu segregation portion, the second Cu segregation portion, the ratio of the Cu concentration in the surface layer portion to the Cu concentration in the inner portion, the Si segregation portion, the Fe concentration distribution, and the O concentration distribution.

The "number proportion of first Cu segregation portions" shown in Table 2 indicates a number proportion of the first Cu segregation portions in a total number of Cu segregation portions counted in the surface layer portion of the particle. The "Cu concentration ratio (1) of first Cu segregation portions" shown in Table 2 indicates a ratio (times) of a Cu concentration in the first Cu segregation portion to the Cu concentration in the crystal grain, and the "Cu concentration ratio (2) of first Cu segregation portions" indicates a ratio (times) of the Cu concentration in the first Cu segregation portion to the Cu concentration in the crystal grain boundary.

The "number proportion of second Cu segregation portions" shown in Table 2 indicates a number proportion of the second Cu segregation portions in a total number of Cu segregation portions counted in the inner portion of the particle.

Further, the "Nb concentration ratio" shown in Table 2 indicates a ratio (times) of the Nb concentration in the crystal grain boundary to the Nb concentration in the crystal grain, and the "B concentration ratio" indicates a ratio (times) of the B concentration in the crystal grain boundary to the B concentration in the crystal grain.

The "ratio of Cu concentration in surface layer portion to Cu concentration in inner portion" shown in Table 2 is a ratio of a Cu concentration in the surface layer portion to a Cu concentration in the inner portion expressed by times.

Further, the Fe concentration and the O concentration at a position 12 nm from a surface of the particle are compared, and "Fe>O" when the Fe concentration is higher, and "O>Fe" when the O concentration is higher are shown in Table 3. Presence or absence of the Si segregation portion was evaluated.

6.2. Resistance Value of Green Compact of Soft Magnetic Powder

Electrical resistance values of green compacts of the soft magnetic powders obtained in Examples and Comparative Examples were measured by the following method.

First, a lower punch electrode was set at a lower end in a columnar cavity with an inner diameter of 8 mm in a mold. Next, the cavity was filled with 0.7 g of the soft magnetic powder. Next, an upper punch electrode was set at an upper end in the cavity. The mold, the lower punch electrode, and the upper punch electrode were set in a load applying device. Next, a load of 20 kgf was applied using a digital force gauge in a direction in which a distance between the lower punch electrode and the upper punch electrode was shortened. An electrical resistance value between the lower punch electrode and the upper punch electrode was measured in a state where a load was applied.

The measured resistance value was evaluated according to the following evaluation criteria.

A: The resistance value is 5.0 kΩ or more.

B: The resistance value is 3.0 kΩ or more and less than 5.0 kΩ.

C: The resistance value is 0.3 kΩ or more and less than 3.0 kΩ.

D: The resistance value is less than 0.3 kΩ.

Evaluation results are shown in Table 3.

6.3. Measurement of Coercive Force of Soft Magnetic Powder

Coercive forces of respective soft magnetic powders obtained in Examples and Comparative Examples were measured. The measured coercive force was evaluated according to the following evaluation criteria.

A: The coercive force is less than 0.90 Oe.

B: The coercive force is 0.90 Oe or more and less than 1.33 Oe.

C: The coercive force is 1.33 Oe or more and less than 1.67 Oe.

D: The coercive force is 1.67 Oe or more and less than 2.00 Oe.

E: The coercive force is 2.00 Oe or more and less than 2.33 Oe.

F: The coercive force is 2.33 Oe or more.

Evaluation results are shown in Table 3.

6.4. Calculation of Saturation Magnetic Flux Density of Soft Magnetic Powder Saturation magnetic flux densities of the soft magnetic powders obtained in Examples and Comparative Examples were calculated based on measurement results of maximum magnetization. Calculation results are shown in Table 3.

6.5. Measurement of Magnetic Permeability of Dust Core

Magnetic permeability of respective dust cores obtained in Examples and Comparative Examples was measured. Measurement results are shown in Table 3.

6.6. Measurement of Iron Loss of Dust Core

Iron losses of respective dust cores obtained in Examples and Comparative Examples were measured based on the following measurement conditions.

Measurement device: BH analyzer, SY-8258 manufactured by Iwatsu Electric Co., Ltd.

Measurement frequency: 900 kHz

Winding number of winding: 36 times on primary side and 36 times on secondary side Wire diameter of winding: 0.5 mm Maximum magnetic flux density: 50 mT Measurement results are shown in Table 3.

TABLE 2

| Sample No. | Example/ Comparative Example | Evaluation result of soft magnate powder: Crystal grain Content proportion % | First Cu segregation portion (surface layer portion): Number proportion % | Average grain size nm | Maximum value of Cu concentration atomic % | Cu concentration ratio (1) times | Cu concentration ratio (2) times |
|---|---|---|---|---|---|---|---|
| No. 1 | Comparative Example | 0 | 0 | — | — | — | — |
| No. 2 | Example | 67 | 85 | 3.5 | 16.7 | 4.5 | 4.1 |
| No. 3 | Example | 71 | 95 | 4.0 | 18.6 | 16.3 | 13.5 |
| No. 4 | Example | 73 | 95 | 4.5 | 22.3 | 17.5 | 12.6 |
| No. 5 | Example | 81 | 100 | 4.0 | 25.0 | 18.9 | 15.6 |
| No. 6 | Example | 33 | 100 | 3.5 | 13.5 | 13.5 | 10.6 |
| No. 7 | Example | 85 | 100 | 3.3 | 24.4 | 10.3 | 8.5 |
| No. 8 | Comparative Example | 0 | 5 | 1.0 | 4.0 | — | — |
| No. 9 | Comparative Example | 3 | 0 | — | — | — | — |
| No. 10 | Comparative Example | 0 | 10 | 1.0 | 2.0 | — | — |
| No. 11 | Comparative Example | 18 | 70 | 5.0 | 8.0 | 2.5 | 2.3 |
| No. 12 | Comparative Example | 22 | 65 | 5.5 | 11.0 | 3.2 | 2.8 |
| No. 13 | Comparative Example | 13 | 50 | 6.5 | 8.0 | 2.3 | 2.0 |
| No. 14 | Comparative Example | 9 | 30 | 8.0 | 10.0 | 2.0 | 1.8 |
| No. 15 | Comparative Example | 10 | 65 | 5.5 | 10.0 | 2.3 | 2.1 |
| No. 16 | Comparative Example | 11 | 60 | 6.0 | 12.0 | 2.1 | 1.9 |

| Sample No. | Evaluation result of soft magnate powder: Second Cu segregation portion (inner portion): Number proportion % | Average grain size nm | Maximum value of Cu concentration atomic % | Crystal grain boundary: Nb concentration ratio times | B concentration ratio times | Ratio of Cu concentration in surface layer portion to Cu concentration in inner portion times |
|---|---|---|---|---|---|---|
| No. 1 | 10 | 1.5 | — | — | — | 0.9 |
| No. 2 | 85 | 4.2 | 18.5 | 1.4 | 1.2 | 1.1 |
| No. 3 | 35 | 5.5 | 20.5 | 2.6 | 2.1 | 1.2 |
| No. 4 | 35 | 6.0 | 25.0 | 2.5 | 2.0 | 1.2 |
| No. 5 | 100 | 5.5 | 28.0 | 2.7 | 2.1 | 1.3 |
| No. 6 | 100 | 4.5 | 19.2 | 2.2 | 1.8 | 1.1 |

TABLE 2-continued

| | | | | | | |
|---|---|---|---|---|---|---|
| No. 7 | 100 | 4.0 | 26.5 | 2.0 | 1.5 | 1.3 |
| No. 8 | 0 | — | — | — | — | 0.0 |
| No. 9 | 5 | 1.0 | 3.0 | — | — | 0.9 |
| No. 10 | 10 | 2.0 | 5.0 | — | — | 0.8 |
| No. 11 | 40 | 4.5 | 10.0 | 1.1 | 1.0 | 0.8 |
| No. 12 | 50 | 5.0 | 20.0 | 1.2 | 1.1 | 0.9 |
| No. 13 | 60 | 7.0 | 8.0 | 1.1 | 1.0 | 0.7 |
| No. 14 | 70 | 8.5 | 10.0 | 1.2 | 1.1 | 0.8 |
| No. 15 | 50 | 5.5 | 12.0 | 1.3 | 1.2 | 0.6 |
| No. 16 | 55 | 6.0 | 14.0 | 1.1 | 1.1 | 0.9 |

TABLE 3

| | | Evaluation result of soft magnetic powder | | Evaluation result of green compact | | | | |
|---|---|---|---|---|---|---|---|---|
| Sample No. | Example/ Comparative Example | State of Fe concentration distribution with respect to O concentration distribution in particle — | Si segregation portion — | Resistance value — | Coercive force — | Saturation magnetic flux density T | Magnetic permeability — | Iron loss kW/m$^2$ |
| No. 1 | Comparative Example | Fe > O | No | D | F | 1.05 | 16.1 | 27400 |
| No. 2 | Example | Fe > O | Yes | A | B | 1.14 | 19.8 | 5036 |
| No. 3 | Example | Fe > O | Yes | A | A | 1.18 | 23.6 | 4200 |
| No. 4 | Example | Fe > O | Yes | A | A | 1.22 | 21.1 | 4987 |
| No. 5 | Example | Fe > O | Yes | A | B | 1.26 | 20.1 | 5507 |
| No. 6 | Example | Fe > O | Yes | A | B | 1.29 | 19.6 | 6179 |
| No. 7 | Example | Fe > O | Yes | A | B | 1.33 | 20.1 | 5768 |
| No. 8 | Comparative Example | Fe > O | No | D | F | 1.32 | 17.3 | 49600 |
| No. 9 | Comparative Example | Fe > O | No | D | F | 1.39 | 18.1 | 40000 |
| No. 10 | Comparative Example | Fe > O | No | D | F | 1.40 | 17.1 | 51200 |
| No. 11 | Comparative Example | Fe > O | Yes | B | E | 1.26 | 17.1 | 34640 |
| No. 12 | Comparative Example | Fe > O | Yes | B | E | 1.25 | 17.0 | 33040 |
| No. 13 | Comparative Example | Fe > O | Yes | B | F | 1.25 | 17.0 | 41040 |
| No. 14 | Comparative Example | Fe > O | Yes | B | E | 1.26 | 16.8 | 36240 |
| No. 15 | Comparative Example | O > Fe | Yes | C | F | 1.25 | 17.0 | 41040 |
| No. 16 | Comparative Example | O > Fe | Yes | C | F | 1.24 | 16.9 | 42640 |

As is clear from Table 3, in soft magnetic powders obtained in each Example, both the low coercive force and the high magnetic permeability were achieved. In the dust core containing the soft magnetic powder obtained in each Example, the result was obtained that the magnetic permeability was high and the iron loss was low.

What is claimed is:

1. A soft magnetic powder comprising:

a particle having a composition represented by $Fe_xCu_aNb_b(Si_{1-y}B_y)_{100-x-a-b}$, a, b, and x being numbers whose units are atomic %, in which $0.3 \leq a \leq 2.0$, $2.0 \leq b \leq 4.0$, and $72.5 \leq x < 75.5$, and y being a number satisfying $f(x) \leq y \leq 0.99$, and $f(x)=(4\times 10^{-34})x^{17.56}$, wherein the particle includes a crystal grain having a grain size of 1.0 nm or more and 30.0 nm or less and containing a Fe—Si crystal, a Cu segregation portion in which Cu is segregated, and a crystal grain boundary, a content proportion of the crystal grain in the particle is 30% or more, and when the Cu segregation portion positioned in a surface layer portion of the particle and having a grain size of 1.0 nm or more and 5.0 nm or less is referred to as a first Cu segregation portion, and the Cu segregation portion positioned in an inner portion of the particle and having a grain size of 3.0 nm or more and 10.0 nm or less is referred to as a second Cu segregation portion, a number proportion of the first Cu segregation portion in the Cu segregation portion positioned in the surface layer portion is 80% or more, and a number proportion of the second Cu segregation portion in the Cu segregation portion positioned in the inner portion is 80% or more.

2. The soft magnetic powder according to claim 1, wherein a Cu concentration in the surface layer portion is 1.1 times or more a Cu concentration in the inner portion.

3. The soft magnetic powder according to claim 1, wherein a Cu concentration in the second Cu segregation portion is more than 6.0 atomic %.

4. The soft magnetic powder according to claim 1, wherein a content proportion of the crystal grain in the particle is 55% or more.

5. A dust core comprising:

the soft magnetic powder according to claim 1.

6. The dust core according to claim 5, wherein when the dust core is formed into a ring shape having an outer diameter of 14 mm, an inner diameter of 8 mm, and a thickness of 3 mm, and magnetic permeability is measured at a measurement frequency of 100 MHz using a conductive wire having a wire diameter of 0.6 mm wound 7 times around the dust core, the magnetic permeability is 18.0 or more.

7. The dust core according to claim 5, wherein when the dust core is formed into a ring shape having an outer diameter of 14 mm, an inner diameter of 8 mm, and a thickness of 3 mm, and an iron loss is measured at a maximum magnetic flux density of 50 mT and a measurement frequency of 900 kHz by using a conductive wire having a wire diameter of 0.5 mm wound 36 times around a primary side and a secondary side, the iron loss is 9000 $kW/m^3$ or less.

8. A magnetic element comprising:

the dust core according to claim 5.

9. An electronic device comprising:

the magnetic element according to claim 8.

* * * * *